United States Patent
Cao et al.

(10) Patent No.: US 11,088,956 B2
(45) Date of Patent: Aug. 10, 2021

(54) AGGREGATE RATE CONTROL METHOD, DEVICE, AND SYSTEM

(71) Applicant: HUAWEI TECHNOLOGIES CO., LTD., Shenzhen (CN)

(72) Inventors: Longyu Cao, Shanghai (CN); Gangjie He, Shanghai (CN); Yijun Yu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/877,722

(22) Filed: May 19, 2020

(65) Prior Publication Data

US 2020/0280521 A1    Sep. 3, 2020

Related U.S. Application Data

(63) Continuation of application No. PCT/CN2018/116323, filed on Nov. 20, 2018.

(30) Foreign Application Priority Data

Nov. 27, 2017    (CN) .......................... 201711221144.X

(51) Int. Cl.
*H04L 12/851* (2013.01)
*H04W 28/08* (2009.01)
(Continued)

(52) U.S. Cl.
CPC .......... *H04L 47/2483* (2013.01); *H04L 45/38* (2013.01); *H04L 45/54* (2013.01);
(Continued)

(58) Field of Classification Search
None
See application file for complete search history.

(56) References Cited

U.S. PATENT DOCUMENTS

| 2015/0195203 A1 | 7/2015 | Beheshti-Zavareh et al. |
| 2016/0277297 A1* | 9/2016 | Chang .................. H04L 45/54 |

(Continued)

FOREIGN PATENT DOCUMENTS

| CN | 102882746 A | 1/2013 |
| CN | 103179046 A | 6/2013 |

(Continued)

OTHER PUBLICATIONS

3GPP, "3rd Generation Partnership Project; Technical Specification Group Services and System Aspects; Policy and charging control architecture (Release 15)", 3GPP TS 23.203 V15.0.0, Sep. 2017, total 257 pages.

(Continued)

*Primary Examiner* — Anh Ngoc M Nguyen
(74) *Attorney, Agent, or Firm* — Maier & Maier, PLLC

(57) ABSTRACT

Embodiments provide an aggregate rate control method, a device, and a system. A gateway switch receives a flow entry and a link table from a software-defined networking (SDN) controller. The flow entry includes at least a match field and a flow-entry instruction, and the link table includes at least a packet processing operation. The gateway switch parses to obtain header information of a received target data packet, and matches the header information with the match field in the flow entry. When the header information matches the match field in the flow entry, a link instruction is executed in the flow-entry instruction in the flow entry. The packet processing operation in the link table is performed, and the packet processing operation is used to discard or buffer the target data packet when a bit rate of an aggregate service flow is greater than a specified maximum aggregate rate.

10 Claims, 10 Drawing Sheets

(51) Int. Cl.
  *H04L 12/721* (2013.01)
  *H04L 12/741* (2013.01)
  *H04L 12/715* (2013.01)
  *H04L 12/859* (2013.01)
  *H04L 12/823* (2013.01)

(52) U.S. Cl.
  CPC ............ *H04L 45/64* (2013.01); *H04L 45/745* (2013.01); *H04L 47/2475* (2013.01); *H04L 47/32* (2013.01); *H04W 28/0967* (2020.05)

(56) References Cited

U.S. PATENT DOCUMENTS

| | | | |
|---|---|---|---|
| 2016/0381620 A1 | 12/2016 | Panaitopol et al. | |
| 2017/0195292 A1* | 7/2017 | Pham | H04L 63/0263 |
| 2019/0182874 A1* | 6/2019 | Cho | H04W 72/04 |

FOREIGN PATENT DOCUMENTS

| | | |
|---|---|---|
| CN | 104272653 A | 1/2015 |
| CN | 104468624 A | 3/2015 |
| CN | 104796353 A | 7/2015 |

OTHER PUBLICATIONS

Ko et al., "OpenQFlow: Scalable OpenFlow with Flow-Based QoS", IEICE Trans. Commun., 2013 The Institute of Electronics, Information and Communication Engineers, vol. E96-B, No. 2, Feb. 2013, pp. 479-488, XP001581639.
Karakus et al., "Quality of Service (QoS) in Software Defined Networking (SDN): A survey", Journal of Network and Computer Applications, vol. 80, 2017, pp. 200-218, XP029885753.
Krishna et al., "Providing Bandwidth Guarantees with OpenFlow", IEEE, 2016, total 6 pages, XP033032055.
Zhang et al., "Rate-Controlled Static-Priority Queueing", IEEE, 1993, pp. 227-236, XP010032346.

* cited by examiner

Aggregate service flow

AGGREGATE RATE CONTROL METHOD, DEVICE, AND SYSTEM

CROSS-REFERENCE TO RELATED APPLICATION

This application is a continuation of International Application No. PCT/CN2018/116323, filed on Nov. 20, 2018, which claims priority to Chinese Patent Application No. 201711221144.X, filed on Nov. 27, 2017. The disclosure of the aforementioned applications are hereby incorporated by reference in their entireties.

TECHNICAL FIELD

An embodiment relates to the communications field, and to an aggregate rate control method, a device, and a system.

BACKGROUND

A 3rd generation partnership project (3GPP) network uses a "best effort" mechanism. To be specific, to meet transmission quality requirements in different service scenarios, a system configures different quality of service (QoS) parameters at the same time to meet the requirements in different service scenarios. QoS parameters defined in a 3GPP protocol include: a QoS class identifier (QCI), an allocation and retention priority (ARP), a guaranteed bit rate (GBR), a maximum bit rate (MBR), a maximum aggregate rate (AMBR), and the like.

In the 3GPP network, a mature mechanism is already in place to control the maximum aggregate rate, but in an OpenFlow-based network, control on the maximum aggregate rate has not been implemented.

SUMMARY

Embodiments provide an aggregate rate control method, to control a maximum aggregate rate in an OpenFlow-based network.

According to a first aspect, an aggregate rate control method is provided, including:

receiving, by a gateway switch, a flow entry and a link table from a software-defined networking (SDN) controller, where the flow entry includes at least a match field and a flow-entry instruction, and the link table includes at least a packet processing operation; parsing, by the gateway switch, to obtain header information of a received target data packet, and matching the header information with the match field in the flow entry; when the packet information matches the match field in the flow entry, executing, by the gateway switch, a link instruction in the flow-entry instruction in the flow entry, where the link instruction is used to point to the link table; and performing, by the gateway switch, the packet processing operation in the link table, where the packet processing operation is used to discard or buffer the target data packet when a bit rate of an aggregate service flow is greater than a specified maximum aggregate rate.

According to a second aspect, an aggregate rate control method is provided, including:

generating, by an SDN controller, a flow entry and a link table according to a QoS control policy, where the flow entry includes at least a match field and a flow-entry instruction, the flow-entry instruction includes at least a link instruction, the link instruction is used to point to the link table, the link table includes at least a packet processing operation, and the packet processing operation is used to discard or buffer a target data packet when a bit rate of an aggregate service flow is greater than a specified maximum aggregate rate; and sending, by the SDN controller, the flow entry and the link table to a gateway switch.

The first aspect and the second aspect describe an aggregate rate control method from perspectives of a gateway switch and an SDN controller respectively, to control a maximum aggregate rate in an OpenFlow-based network.

With reference to the first aspect or the second aspect, the discarding or buffering the target data packet may include at least two embodiments:

In the first embodiment, the gateway switch directly discards or buffers the target data packet.

In the second embodiment, the gateway switch discards or buffers the target data packet according to a packet discarding or buffering policy. For example, the gateway switch discards or buffers the target data packet when a priority of the target data packet is lower than a priority of another data packet in the aggregate service flow; or the gateway switch discards or buffers the target data packet when a priority of the target data packet is a specified priority.

With reference to the first aspect or the second aspect, in a case of buffering the target data packet, after the target data packet is buffered, when the bit rate of the aggregate service flow decreases and is less than the specified maximum aggregate rate, the gateway switch retransmits the target data packet. The following separately describes how the gateway switch retransmits the target data packet from two perspectives: a transmission path and a retransmission manner.

From the perspective of a transmission path, the gateway switch retransmits the target data packet along a user plane path existing before buffering; or the gateway switch retransmits the target data packet along a newly established user plane path.

From the perspective of a retransmission manner, the gateway switch directly retransmits the target data packet; or the gateway switch retransmits the target data packet when the priority of the target data packet is higher than a priority of another buffered data packet.

With reference to the first aspect or the second aspect, the link table includes at least a link table identifier, the maximum aggregate rate, and the packet processing operation.

According to a third aspect, an aggregate rate control method is provided, including: receiving, by an SDN controller, a bit rate that is of an aggregate service flow and that is reported by a gateway switch; determining, by the SDN controller, that the bit rate of the aggregate service flow is greater than a maximum aggregate rate; and when the bit rate of the aggregate service flow is greater than the maximum aggregate rate, delivering, by the SDN controller, a flow entry to the gateway switch, where the flow entry is used to instruct the gateway switch to discard or buffer a target data packet in the aggregate service flow, so that the aggregate service flow shares the maximum aggregate rate.

According to a fourth aspect, an aggregate rate control method is provided, including:

reporting, by a gateway switch, a bit rate of an aggregate service flow to an SDN controller;

receiving, by the gateway switch, a flow entry returned by the SDN controller based on the bit rate of the aggregate service flow, where the flow entry is used to instruct the gateway switch to discard or buffer a target data packet in the aggregate service flow, so that the aggregate service flow shares a maximum aggregate rate; and executing, by the gateway switch, a flow-entry instruction in the flow entry to discard or buffer the target data packet.

The third aspect and the fourth aspect describe an aggregate rate control method from perspectives of a gateway switch and an SDN controller respectively, to control a maximum aggregate rate in an OpenFlow-based network.

With reference to the third aspect or the fourth aspect, that the flow entry is used to instruct the gateway switch to discard or buffer the target data packet includes at least the following two embodiments:

In the first embodiment, the flow entry is used to instruct the gateway switch to directly discard or buffer the target data packet.

In the second embodiment, the flow entry is used to instruct the gateway switch to discard or buffer the target data packet when a priority of the target data packet is lower than a priority of a data packet in the aggregate service flow.

With reference to the third aspect or the fourth aspect, when the bit rate of the aggregate service flow decreases and is less than the aggregate bit rate, the SDN controller instructs the gateway switch to retransmit the buffered target data packet.

From a perspective of a transmission path, the gateway switch retransmits the target data packet along a user plane path existing before buffering; or the gateway switch retransmits the target data packet along a newly established user plane path.

From a perspective of a retransmission manner, the gateway switch directly retransmits the target data packet; or the gateway switch retransmits the target data packet when the priority of the target data packet is higher than a priority of another buffered data packet.

According to a fifth aspect, a first network device is provided, where the first network device includes units that can perform the method according to the first aspect or the fourth aspect.

According to a sixth aspect, a second network device is provided, where the second network device includes units that can perform the method according to the second aspect or the third aspect.

According to a seventh aspect, a first network device is provided, including a processor, a transmitter, and a receiver, where the processor is configured to perform the method according to the first aspect; or the processor is configured to perform the method according to the fourth aspect.

According to an eighth aspect, a second network device is provided, including a processor, a transmitter, and a receiver, where the processor is configured to perform the method according to the second aspect; or the processor is configured to perform the method according to the third aspect.

According to a ninth aspect, a communications system is provided, including a first network device and a second network device. When the first network device is configured to implement the method according to the first aspect, the second network device is configured to implement the method according to the second aspect; or when the first network device is configured to implement the method according to the fourth aspect, the second network device is configured to implement the method according to the third aspect.

BRIEF DESCRIPTION OF DRAWINGS

To describe the technical solutions in the embodiments more clearly, the following briefly describes the accompanying drawings required for describing the embodiments. Apparently, the accompanying drawings in the following description show some embodiments, and a person of ordinary skill in the art may still derive other drawings from these accompanying drawings without creative efforts.

DESCRIPTION OF EMBODIMENTS

Figure 1:
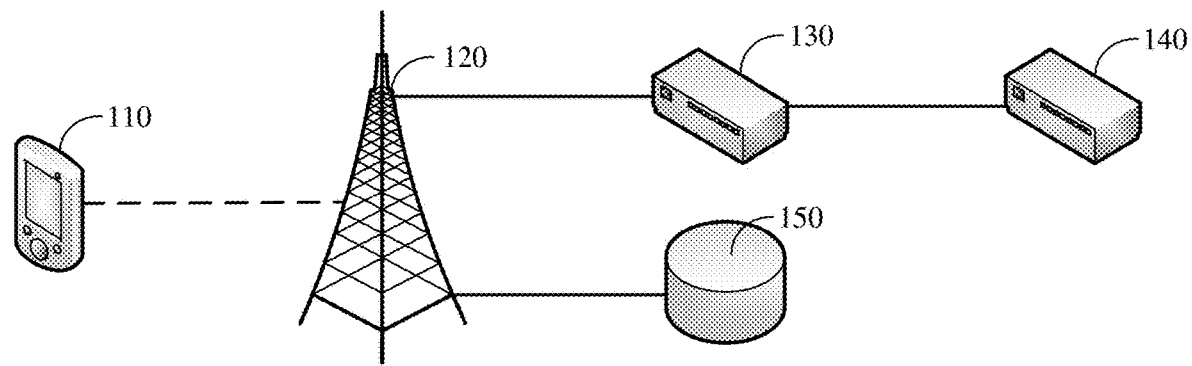
FIG. 1 is a schematic diagram of a system structure of a 3GPP network in the prior art.

As shown in FIG. 1, a conventional 3GPP network includes: a terminal device (user equipment, UE) 110, a base station (eNodeB, eNB) 120, a serving gateway (SGW) 130, a packet data node gateway (PGW) 140, and a mobility management entity (MME) 150. The 3GPP network separates a user plane function from a control plane function. The user plane function is responsible for data service transmission and processing, and the control plane function is responsible for coordination and control of signaling transmission and processing. The following separately describes a user plane function and a control plane function that are implemented by each device in the 3GPP network.

Functions implemented by the eNB 120 may be classified into user plane functions and control plane functions. The user plane functions of the eNB 120 include forwarding and scheduling processing of a data packet and a signaling message. The control plane functions of the eNB 120 include radio resource allocation and L1 and L2 configuration management. It should be understood that the examples of the user plane function and the control plane function of the eNB 120 are merely used for description, and do not constitute a specific limitation.

Functions implemented by the SGW 130 may be classified into user plane functions and control plane functions. The user plane functions of the SGW 130 include: data packet forwarding, QoS execution, charging information statistics, and the like. The control plane function of the SGW includes bearer management. It should be understood that the examples of the user plane function and the control plane function of the SGW 130 are merely used for description, and do not constitute a specific limitation.

Functions implemented by the PGW 140 may be classified into user plane functions and control plane functions. The user plane functions of the PGW 140 include: data forwarding, QoS execution, and the like. The control plane functions of the PGW 140 include: IP address allocation, bearer management, and the like. It should be understood that the examples of the user plane function and the control plane function of the PGW 140 are merely used for description, and do not constitute a specific limitation.

Functions implemented by the MME 150 are mainly control plane functions. The control plane functions of the MME 150 include: paging, handover, roaming, authentication, encryption and integrity protection for non-access stratum signaling, access stratum security control, idle-mode mobility control, and the like. It should be understood that the examples of the control plane function of the MME 150 are merely used for description, and does not constitute a specific limitation.

It may be contemplated that the example shown in FIG. 1 may be applied to a 5G system or a subsequent evolved system in addition to a 4G system. This is not specifically limited herein.

With the development of an OpenFlow technology, the conventional 3GPP network is reformed by using the OpenFlow technology in the prior art, so that an OpenFlow network in the embodiments is obtained.

Figure 2:
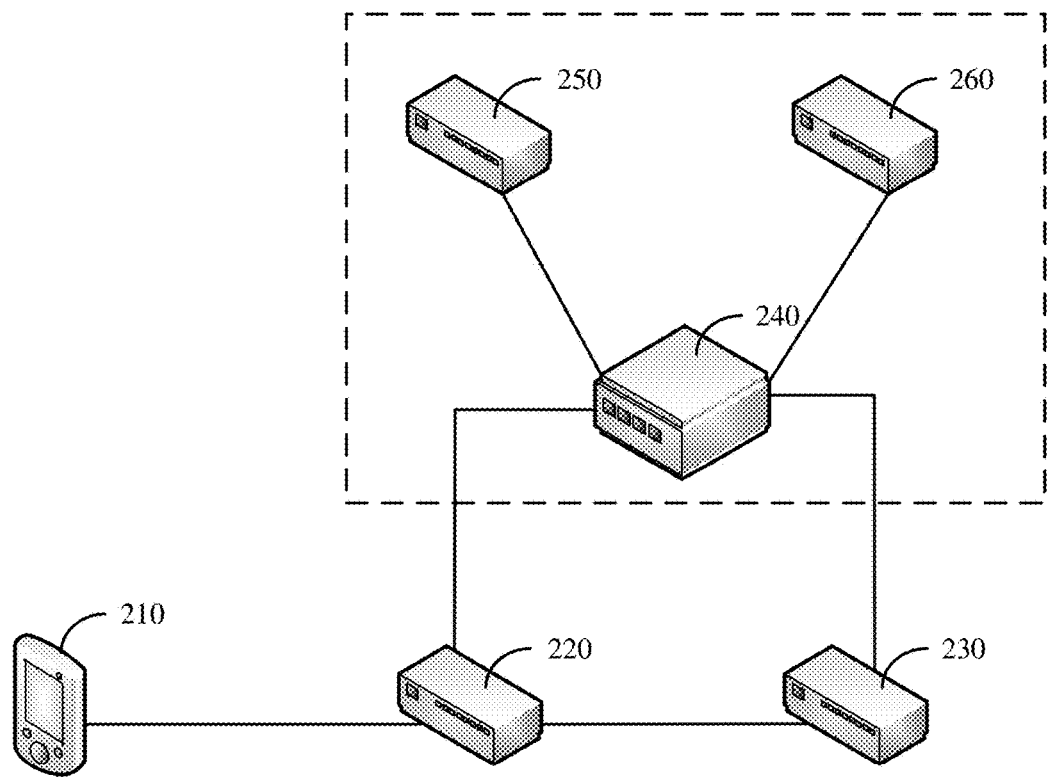
FIG. 2 is a schematic diagram of a system structure of an OpenFlow-based network according to an embodiment.

As shown in FIG. 2, the OpenFlow network includes UE 210, an eNB switch 220, a gateway (GW) switch 230, an SDN controller 240, an eNB controller 250, and a core network controller 260. It may be contemplated that although a network architecture in the embodiments is different from a network architecture of the 3GPP network, the OpenFlow network can implement the functions in the 3GPP network. The eNB switch 220 is configured to implement the user plane functions of the eNB in the 3GPP network shown in FIG. 1. The gateway switch 230 is configured to implement the user plane function of the SGW and the user plane functions of the PGW in the 3GPP network shown in FIG. 1. The eNB controller 250 is configured to implement the control plane functions of the eNB in the 3GPP network shown in FIG. 1. The core network controller 260 is configured to implement the control plane functions of the SGW, the control plane functions of the PGW, and the control plane functions of the MME. It should be understood that the network architecture shown in FIG. 2 is merely an example, and should not constitute a specific limitation.

It may be contemplated that, because the function of QoS execution is implemented by the gateway in the 3GPP network, correspondingly, the QoS execution function is implemented by the gateway switch in the OpenFlow network. In other words, the gateway switch needs to control QoS parameters such as a QCI, an ARP, a GBR, an MBR, and an AMBR. The following separately describes in detail the QCI, the ARP, the GBR, the MBR, and the AMBR that are included in the QoS parameters.

A resource type, priority, packet delay budget, packet loss rate, and the like are defined for a QCI in terms of different QCI levels, to provide different quality of service for a data service. When QCI levels are different, at least one of a resource type, a priority, a packet delay budget, a packet loss rate, and the like that correspond to a QCI level and that are determined by an OpenFlow-based network for a data service is also different. It may be contemplated that when the resource type is a GBR type, quality of service provided by the network for the data service is better than quality of service provided by the network for the data service when the resource type is a non-GBR type. When the priority is high, quality of service provided by the network for the data service is better than quality of service provided by the network for the data service when the priority is low. When the packet delay budget is small, quality of service provided by the network for the data service is better than quality of service provided by the network for the data service when the packet delay budget is large. When the packet loss rate is small, quality of service provided by the network for the data service is better than quality of service provided by the network for the data service when the packet loss rate is large. For an exemplary definition of the QCI, reference may be made to Table 1.

TABLE 1

Standard QCI definition

| QCI | Resource type | Priority | Packet delay budget (ms) | Packet loss rate | Typical service |
|---|---|---|---|---|---|
| 1 | GBR | 2 | 100 | $10^{-2}$ | Voice session |
| 2 | | 4 | 150 | $10^{-3}$ | Video session |
| 3 | | 3 | 50 | $10^{-3}$ | Real-time gaming |
| 4 | | 5 | 300 | $10^{-6}$ | Non-conversational video |
| 65 | | 0.7 | 75 | $10^{-2}$ | Mission-critical push-to-talk (MCPTT) voice |
| 66 | | 2 | 100 | $10^{-2}$ | Non-MCPTT voice |
| 75 | | 2.5 | 50 | $10^{-2}$ | Vehicle-to-everything (V2X) short message |
| 5 | Non-GBR | 1 | 100 | $10^{-6}$ | IP multimedia subsystem (IMS) instruction |
| 6 | | 6 | 300 | $10^{-6}$ | Video stream buffering service |
| 7 | | 7 | 100 | $10^{-3}$ | Voice and video live broadcast |
| 8 | | 8 | 300 | $10^{-6}$ | Transmission control protocol (TCP) -based service |
| 9 | | 9 | | | |
| 69 | | 0.5 | 60 | $10^{-6}$ | MCPTT signaling |
| 70 | | 5.5 | 200 | $10^{-6}$ | MCPTT data |
| 79 | | 6.5 | 50 | $10^{-2}$ | V2X short message |

An ARP parameter includes the following three elements: a priority (priority level), a pre-emption capability, and pre-emption vulnerability. When resources are insufficient, a bearer is set up for a data service with a high priority first rather than a data service with a low priority. When resources are insufficient, a data service with a strong pre-emption capability is more likely to preempt a resource of another bearer than a data service with a weak pre-emption capability. When resources are insufficient, a data service with high pre-emption vulnerability tends to release a bearer to provide a resource for another bearer than a data service with low pre-emption vulnerability.

A GBR is used to indicate a minimum bit rate provided by a network for a data service. In other words, a bit rate provided by the network for the data service has to be greater than the GBR. For example, assuming that the GBR is 3 Mbit/s, the bit rate provided by the network for the data service may be 4 Mbit/s, 5 Mbit/s, or the like. It may be understood that the foregoing example of the GBR is merely used for description, and does not constitute a specific limitation.

An MBR is used to indicate a maximum bit rate provided by a network for a data service. In other words, the bit rate provided by the network for the data service has to be less than the MBR. For example, assuming that the MBR is 6 Mbit/s, the bit rate provided by the network for the data service may be 4 Mbit/s, 5 Mbit/s, or the like. It may be understood that the foregoing example of the MBR is merely used for description, and does not constitute a specific limitation.

Figure 3:
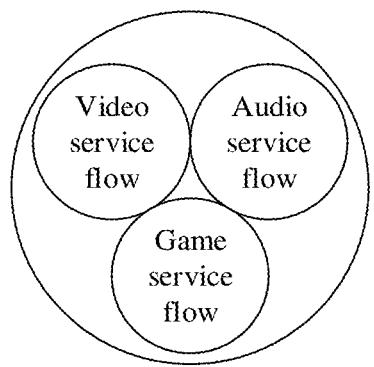
FIG. 3 is a schematic composition diagram of a user-level aggregate service flow according to an embodiment.

An AMBR is used to impose a limitation that a bit rate provided for an aggregate service flow cannot be greater than the maximum aggregate rate. In other words, when the bit rate of the aggregate service flow is greater than the maximum aggregate rate, packets of some or all service flows in the aggregate service flow need to be discarded or buffered. The aggregate service flow may include a user equipment-level aggregate service flow, an access point name (APN)-level aggregate service flow, and the like. As shown in FIG. 3, a UE-level aggregate service flow may be a combination of a plurality of service flows accumulated by the same piece of user equipment, for example, a video service flow, a voice service flow, and a game service flow of the same subscriber. The access point-level aggregate service flow may be a combination of a plurality of service flows accumulated by the same access device, for example, a video service flow, a voice service flow, and a game service flow of the same access device. For example, assuming that the maximum aggregate rate is 10 Mbit/s, a bit rate of a video service flow in the aggregate service flow is 3 Mbit/s, a bit rate of a voice service flow is 2 Mbit/s, and a bit rate of a game service flow is 4 Mbit/s, the bit rate of the aggregate service flow is less than the maximum aggregate rate.

Figure 4:
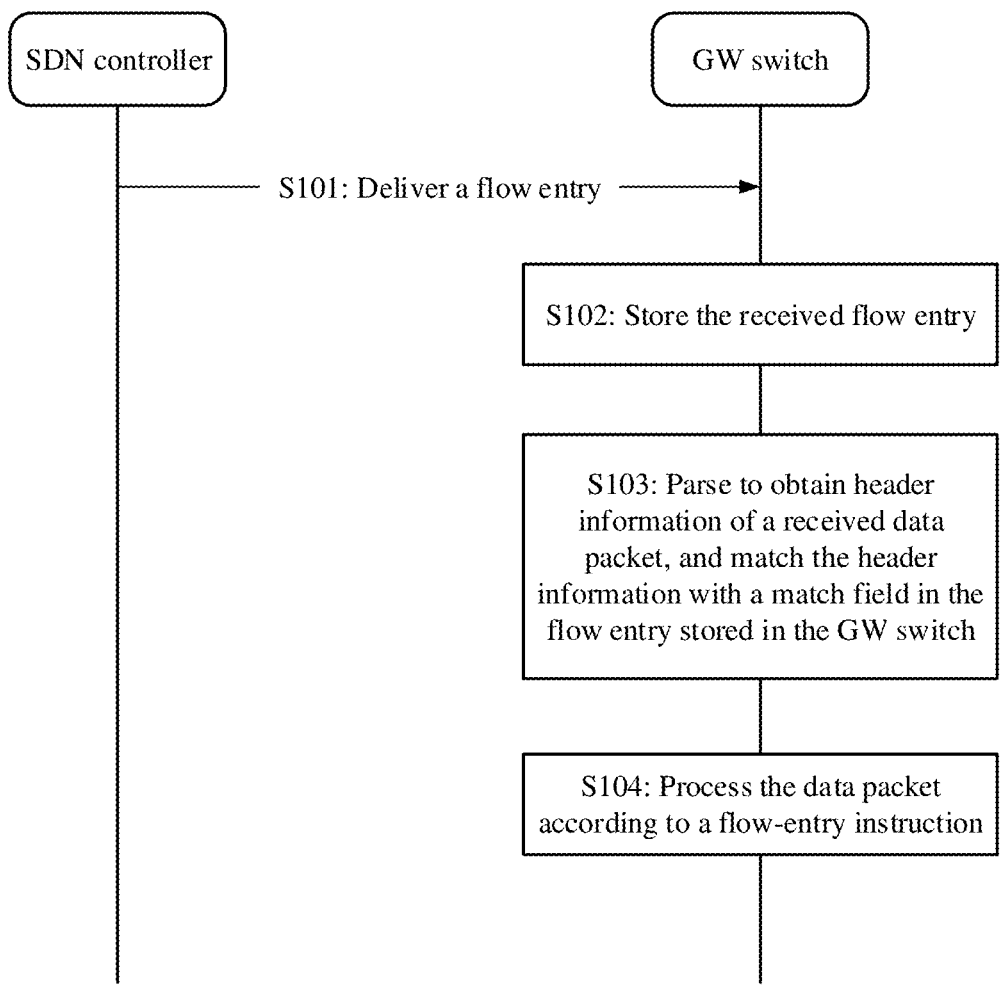
FIG. 4 is a schematic flowchart of data processing in an OpenFlow-based network in the prior art.

In an exemplary implementation, the gateway switch can easily control the QCI, the GBR, the MBR, and the like, but it is difficult for the gateway switch to control the AMBR. Exemplary analyses are as follows:

In the prior art, the OpenFlow network processes a data packet by delivering a flow entry. For ease of understanding, the following example describes, by using the gateway switch as an example, how the OpenFlow-based network processes a data packet by delivering a flow entry. Steps are shown in FIG. 4, in step S101, an SDN controller delivers a flow entry to the gateway switch. In step S102, the gateway switch stores the received flow entry. In step S103, after receiving the data packet, the gateway switch parses to obtain header information of a received target data packet, and matches the header information with a match field in the flow entry stored in the gateway switch. In step S104, if the header information matches the match field in the flow entry, the gateway switch processes the data packet according to a flow-entry instruction.

To meet requirements of different scenarios, the OpenFlow network needs to process the data packet based on different granularities. For example, the OpenFlow network may need to process the data packet based on a plurality of different granularities such as a flow granularity, a bearer granularity, an APN granularity, and a UE granularity. For example, when performing QoS control, a gateway switch controls the QCI, the GBR, and the MBR through processing of the data packet based on a flow granularity, and controls the AMBR by processing the data packet based on an APN granularity and a UE granularity.

However, the OpenFlow-based network processes the data packet based on the flow entry, that is, the OpenFlow-based network processes the data packet based on a flow granularity. Therefore, it is difficult for the OpenFlow-based network to process the data packet at a granularity larger than the flow granularity. However, control on the QCI, the GBR, the MBR, and the like is performed through processing of the data packet based on a flow granularity, and control on the AMBR is performed through processing of the data packet based on a UE granularity or an APN granularity. Therefore, the OpenFlow-based network can only control the QCI, the GBR, the MBR, and the like, but control on the AMBR is not implemented.

To resolve the foregoing problem, an embodiment provides two aggregate rate control methods, apparatuses, and systems, to control an AMBR in an OpenFlow-based network architecture.

Figure 5:
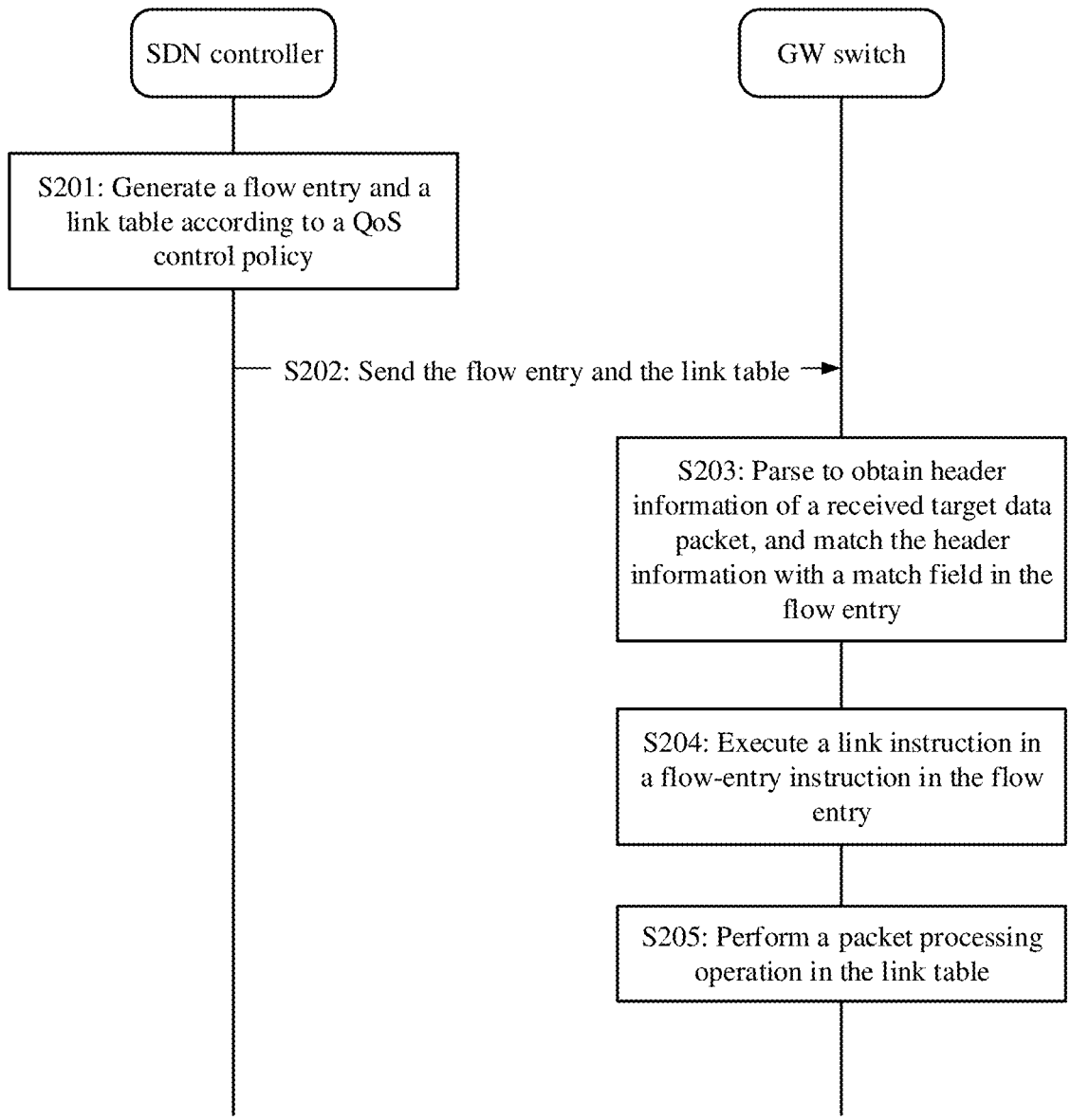
FIG. 5 is an interaction diagram of an aggregate rate control method according to an embodiment.

As shown in FIG. 5, an embodiment provides an aggregate rate control method. The aggregate rate control method in this embodiment includes the following steps.

In step S201, an SDN controller generates a flow entry and a link table according to a QoS control policy.

In this embodiment, the QoS control policy includes at least a maximum aggregate rate of an aggregate service flow. Optionally, the QoS control policy may further include a QCI of the aggregate service flow and a QCI, a GBR, an MBR, and the like of a non-aggregate service flow. For example, the QoS control policy may be: The maximum aggregate rate of the aggregate service flow is 10 Mbit/s. It may be understood that the foregoing example of the QoS control policy is merely used for description, and does not constitute a specific limitation.

In this embodiment, the maximum aggregate rate is a maximum bit rate that can be provided by a network for the aggregate service flow. For example, if the bit rate of the aggregate service flow is less than the maximum aggregate rate, the network can work normally; if the bit rate of the aggregate service flow is greater than the maximum aggregate rate, the network needs to discard or buffer data packets of some and all service flows in the aggregate service flow, until the bit rate of the aggregate service flow is less than the maximum aggregate rate. In other words, a bit rate of the aggregate service flow in the network cannot exceed the maximum aggregate rate.

For example, it is assumed that the maximum aggregate rate is 20 Mbit/s, a bit rate of a video service flow in the aggregate service flow is 7 Mbit/s, a bit rate of a voice service flow is 3 Mbit/s, and a bit rate of a game service flow is 5 Mbit/s. In this case, the bit rate of the aggregate service flow is less than the maximum aggregate rate, and the network can work normally. It is further assumed that the maximum aggregate rate is 20 Mbit/s, a bit rate of a video service flow in the aggregate service flow is 10 Mbit/s, a bit rate of a voice service flow is 3 Mbit/s, and a bit rate of a game service flow is 8 Mbit/s. In this case, the bit rate of the aggregate service flow is greater than the maximum aggregate rate, and the network needs to discard or buffer data packets of some or all service flows in the aggregate service flow.

In step S202, the SDN controller sends the flow entry and the link table to a gateway switch. Correspondingly, the gateway switch receives the flow entry and the link table from the SDN controller.

In step S203, the gateway switch parses to obtain header information of a received target data packet, and matches the header information with a match field in the flow entry.

In this embodiment, the target data packet is data arranged in an exemplary format. When the target data packet uses a different protocol, a format of the target data packet may be different. For example, a format of the target data packet using a TCP/IP protocol is different from a format of the target data packet using a user datagram protocol (UDP). However, even if the target data packet has a different format, which is shown in Table 2, the target data packet may include the header information (head), a payload, and check information. The header information may be used to carry transmission information, for example, a packet length, a packet type, identification information of a packet that are related to user data. The identification information of the packet may be a unique identifier of the packet, for example, at least one of information (a source IP address, a destination IP address, a protocol type, a source port number, and a destination port number) in an IP 5-tuple, or at least one of various header fields (a source MAC address, a destination MAC address, and the like) of an Ethernet frame header. This is not specifically limited herein. The payload may be used to carry the user data, for example, video data, audio data, and game data. The check information is used to check correctness of the header information and the payload. It may be contemplated that a larger proportion of the payload in the entire target data packet indicates higher transmission efficiency of the target data packet, while a smaller proportion of the payload in the entire target data packet indicates lower transmission efficiency of the target data packet.

TABLE 2

Target data packet

| Header information (header) | Payload | Error correcting code (ECC) |
| --- | --- | --- |

As shown in Table 3, using an Ethernet frame protocol as an example, the target data packet may include a 6-byte destination MAC address, a 6-byte source MAC address, a 2-byte packet type/length, 46- to 1500-byte data, and a 4-byte frame check sequence (FCS). The header information of the target data packet includes the destination MAC address, the source MAC address, the packet type, and the packet length. The payload of the target data packet includes the 46- to 1500-byte data. The check information of the data packet includes the 4-byte FCS. It should be understood that the foregoing example is described by using an example in which the target data packet uses the Ethernet frame protocol. However, in an exemplary embodiment, the target data packet may alternatively use another protocol. This is not specifically limited herein.

TABLE 3

Target data packet (Ethernet frame protocol)

| Destination MAC address | Source MAC address | Packet type/length | Data | Frame check sequence |
| --- | --- | --- | --- | --- |

In this embodiment, as shown in Table 4, the flow entry may include but is not limited to: a match field, a priority, a counter, a flow-entry instruction (instruction), timeout, an additional attribute (cookie), and a flag. It should be understood that the flow entry shown in Table 4 is merely an example, and should not constitute a specific limitation.

TABLE 4

Flow entry

| Match field | Priority | Counter | Flow-entry instruction | Aging time (timeout) | Additional attribute (cookie) | Flag |
| --- | --- | --- | --- | --- | --- | --- |

In an exemplary implementation, the match field may be used to carry a specified value for matching the specified value with the header information of the target data packet. For example, the specified value may be at least one of information (a source IP address, a destination IP address, a protocol type, a source port number, and a destination port number) in an IP 5-tuple, or may be at least one of various header fields (a source MAC address, a destination MAC address, and the like) of an Ethernet frame header. It should be noted that the foregoing example of the match field is merely used for description, and should not constitute a specific limitation. In an exemplary embodiment, a flow entry corresponding to the target data packet may be determined by matching the header information of the target data packet with the match field in the flow entry, to obtain a manner of processing the target data packet.

In an exemplary implementation, the flow-entry instruction is used to indicate a manner of processing the target data packet, for example, pointing to a link table, forwarding, discarding, modification of a packet header, encapsulation, and decapsulation. In an exemplary embodiment, when the header information of the target data packet can match the match field in the flow entry, the flow-entry instruction in the flow entry is correspondingly executed.

In step S204, when the header information of the target data packet matches the match field in the flow entry, the gateway switch executes a link instruction in the flow-entry instruction in the flow entry.

In this embodiment, when the header information of the target data packet matches the match field in the flow entry, the gateway switch executes the link instruction in the flow-entry instruction in the flow entry, to point to the link table. For example, it is assumed that a match field in a flow entry delivered by the SDN controller to the gateway switch is as follows: a source IP address is 192.168.0.12, a destination IP address is 192.168.0.135, and a flow-entry instruction is pointing to the link table. After receiving a data packet, the gateway switch parses to obtain header information of a received target data packet, where the header information is as follows: a source IP address is 192.168.0.12, and a destination IP address is 192.168.0.135. In this case, the header information of the target data packet matches the match field in the flow entry, and therefore the gateway switch points to the link table according to the flow-entry instruction. It should be understood that the example herein is merely used as an example, and should not constitute a specific limitation.

In step S205, the gateway switch performs a packet processing operation in the link table.

In this embodiment, as shown in Table 5, the link table includes at least a link table identifier, a maximum aggregate rate, and a packet processing operation.

TABLE 5

Link table

| Link table identifier (LINK-ID) | Maximum aggregate rate (AMBR) | Packet processing operation (type-specific arguments) |
|---|---|---|

The link table identifier may be a unique identifier of the link table. The maximum aggregate rate is obtained according to the QoS control policy. The packet processing operation is used to discard or buffer the target data packet when a bit rate of an aggregate service flow is greater than a specified maximum aggregate rate. Optionally, the link table may further include a specified priority, where the specified priority is used to instruct the gateway switch to discard or buffer a data packet with a specified priority. It should be noted that the link table shown in Table 5 is merely an example, and should not constitute a specific limitation.

Figure 6:
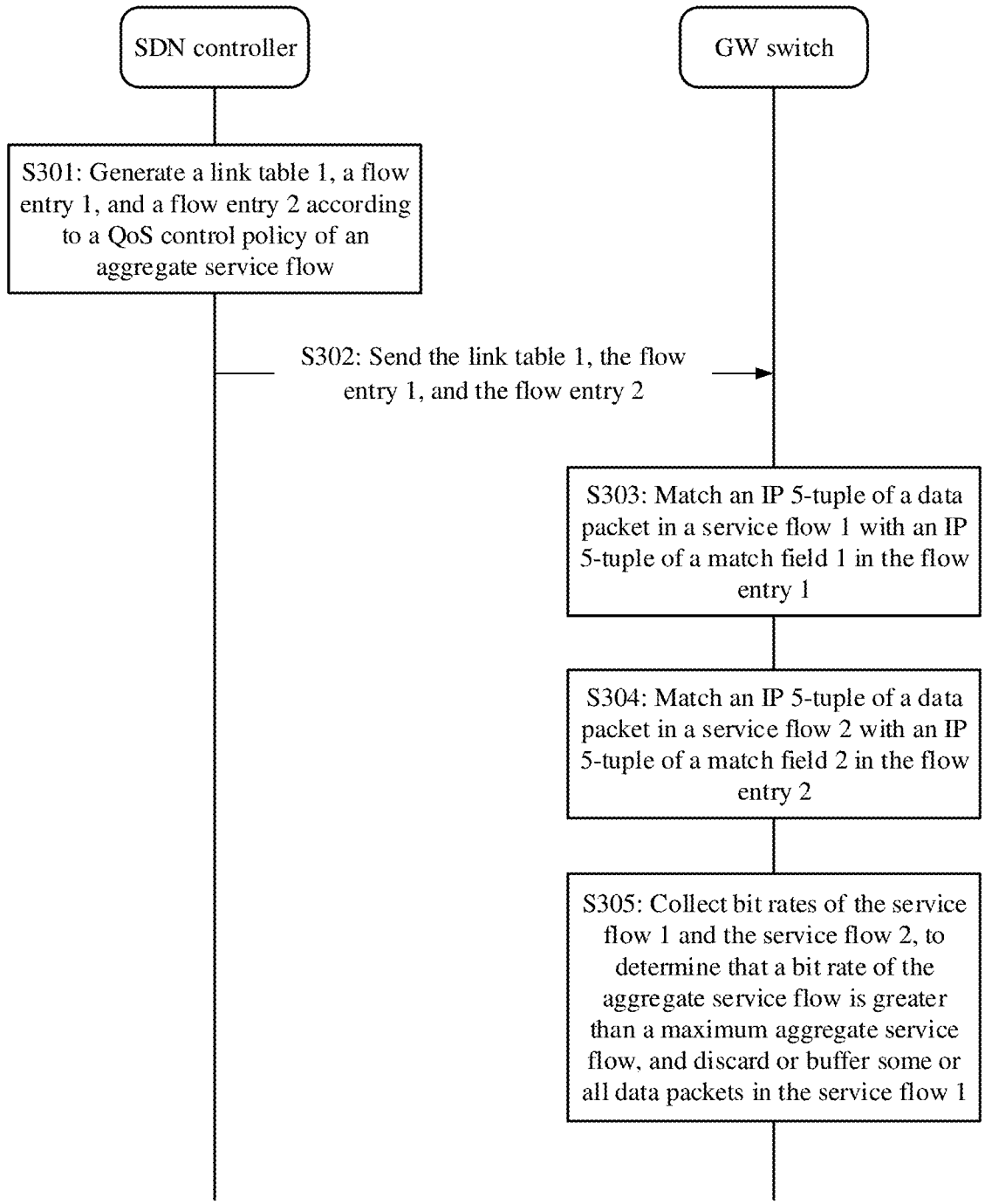
FIG. 6 is a schematic interaction diagram of an exemplary embodiment of the aggregate rate control method shown in FIG. 5.

The following describes, with reference to an exemplary application scenario, how to control a maximum aggregate rate by using an aggregate rate control method shown in FIG. 5. It is assumed that an aggregate service flow includes a service flow 1 and a service flow 2, a bit rate of the service flow 1 is 6 Mbit/s, a bit rate of the service flow 2 is 5 Mbit/s, and a QoS control policy is that a maximum aggregate rate of the aggregate service flow is 10 Mbit/s. As shown in FIG. 6, exemplary steps may be as follows:

In step S301, an SDN controller generates a link table 1, a flow entry 1, and a flow entry 2 according to the QoS control policy of the aggregate service flow.

In this embodiment, a link identifier of the link table 1 is LINK-ID 1, the maximum aggregate rate is 10 Mbit/s, and a packet processing operation is discarding or buffering a data packet of the service flow 1 when a bit rate of the aggregate service flow is greater than 10 Mbit/s. A match field 1 in the flow entry 1 is an IP 5-tuple of the service flow 1, and a flow-entry instruction 1 is pointing to the link table 1 whose link identifier is LINK-ID 1. A match field 2 in the flow entry 2 is an IP 5-tuple of the service flow 2, and a flow-entry instruction 2 is pointing to the link table 1 whose link identifier is LINK-ID 1.

In step S302, the SDN controller delivers the flow entry 1, the flow entry 2, and the link table 1 to a gateway switch. Correspondingly, the gateway switch receives the flow entry 1, the flow entry 2, and the link table 1 that are delivered by the SDN controller.

In step S303, when the service flow 1 passes through the gateway switch, the gateway switch matches an IP 5-tuple of a data packet in the service flow 1 with an IP 5-tuple of the match field 1 in the flow entry 1. If the IP 5-tuple of the data packet in the service flow 1 matches the IP 5-tuple of the match field 1 in the flow entry 1, the gateway switch executes the flow-entry instruction 1 to point to the link table 1 whose link identifier is LINK-ID 1.

In step S304, when the service flow 2 passes through the gateway switch, the gateway switch matches an IP 5-tuple of a data packet in the service flow 2 with an IP 5-tuple of the match field 2 in the flow entry 2. Because the IP 5-tuple of the data packet in the service flow 2 matches the IP 5-tuple of the match field 2 in the flow entry 2, the gateway switch executes the flow-entry instruction 2 to point to the link table 1 whose link identifier is LINK-ID 1.

In step S305, the gateway switch performs the packet processing operation in the link table 1, and calculates that a total bit rate of the service flow 1 and the service flow 2 is 11 Mbit/s, to determine that the bit rate of the aggregate service flow is greater than the maximum aggregate service flow. In this case, the gateway switch discards or buffers some or all data packets in the service flow 1.

Figure 7:
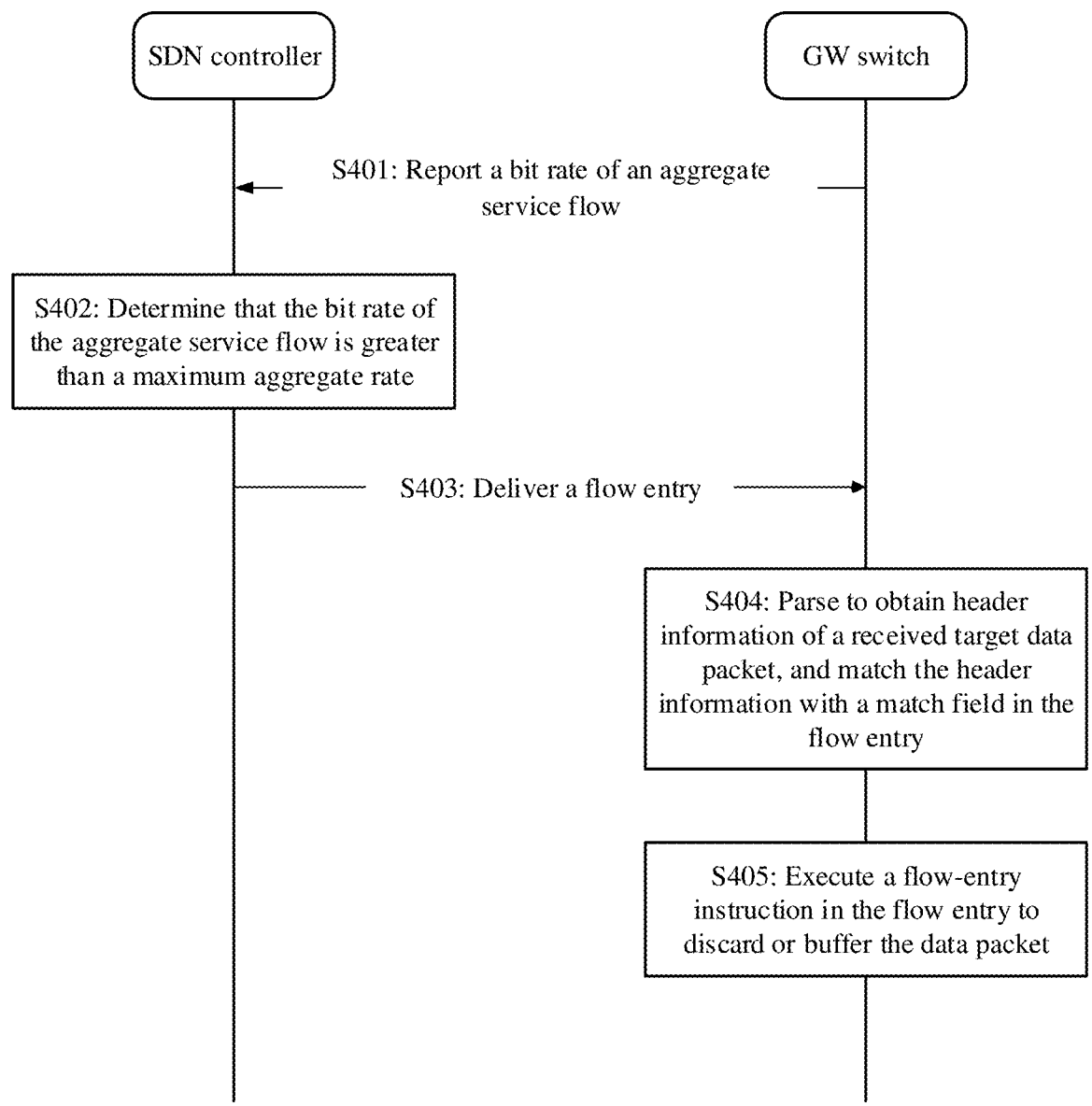
FIG. 7 is an interaction diagram of another aggregate rate control method according to an embodiment.

As shown in FIG. 7, an embodiment provides another aggregate rate control method. The aggregate rate control method in this embodiment includes the following steps.

In step S401, a gateway switch reports a bit rate of an aggregate service flow to an SDN controller. Correspondingly, the SDN controller receives the bit rate that is of the aggregate service flow and that is reported by the gateway switch.

In this embodiment, the aggregate service flow may be a user equipment-level aggregate service flow, an access point-level aggregate service flow, or the like. The user-level aggregate service flow may be a combination of a plurality of service flows accumulated by the same piece of user equipment, for example, a video service flow, a voice service flow, and a game service flow of the same subscriber. The access point-level aggregate service flow may be a combination of a plurality of service flows accumulated by the same access device, for example, a video service flow, a voice service flow, and a game service flow of the same access device. It can be understood that the foregoing example of the aggregate service flow is merely used for description, and should not constitute a specific limitation. In another possible embodiment, a quantity, a type, and the like of service flows in the aggregate service flow may be different from each other.

In step S402, the SDN controller determines that the bit rate of the aggregate service flow is greater than a maximum aggregate rate.

In this embodiment, the maximum aggregate rate is a maximum bit rate that can be provided by a network for the aggregate service flow. For example, if the bit rate of the aggregate service flow is less than the maximum aggregate rate, the network can work normally; if the bit rate of the aggregate service flow is greater than the maximum aggregate rate, the network needs to discard or buffer data packets of some and all service flows in the aggregate service flow, until the bit rate of the aggregate service flow is less than the maximum aggregate rate. In other words, a bit rate of the aggregate service flow in the network cannot exceed the maximum aggregate rate.

For example, it is assumed that the maximum aggregate rate is 20 Mbit/s, a bit rate of a video service flow in the aggregate service flow is 7 Mbit/s, a bit rate of a voice service flow is 3 Mbit/s, and a bit rate of a game service flow is 5 Mbit/s. In this case, the bit rate of the aggregate service flow is less than the maximum aggregate rate, and the network can work normally. It is further assumed that the maximum aggregate rate is 20 Mbit/s, a bit rate of a video service flow in the aggregate service flow is 10 Mbit/s, a bit rate of a voice service flow is 3 Mbit/s, and a bit rate of a game service flow is 8 Mbit/s. In this case, the bit rate of the aggregate service flow is greater than the maximum aggregate rate, and the network needs to discard or buffer data packets of some or all service flows in the aggregate service flow.

In step S403, when the bit rate of the aggregate service flow is greater than the maximum aggregate rate, the SDN controller delivers a flow entry to the gateway switch. Correspondingly, the gateway switch receives the flow entry delivered by the SDN controller.

In step S404, the gateway switch parses to obtain header information of a received target data packet, and matches the header information with a match field in the flow entry.

In this embodiment, the target data packet is data arranged in an exemplary format. When the target data packet uses a different protocol, a format of the target data packet may be different. For example, a format of the target data packet using a TCP/IP protocol is different from a format of the target data packet using a UDP. However, even if the target data packet has a different format, which is shown in Table 2, the target data packet may include the header information (head), a payload, and check information. The header information may be used to carry transmission information, for example, a packet length, a packet type, identification information of a packet that are related to user data. The identification information of the packet may be a unique identifier of the packet, for example, at least one of information (a source IP address, a destination IP address, a protocol type, a source port number, and a destination port number) in an IP 5-tuple, or at least one of various header fields (a source MAC address, a destination MAC address, and the like) of an Ethernet frame header. This is not specifically limited herein. The payload may be used to carry the user data, for example, video data, audio data, and game data. The check information is used to check correctness of the header information and the payload. It may be contemplated that a larger proportion of the payload in the entire target data packet indicates higher transmission efficiency of the target data packet, while a smaller proportion of the payload in the entire target data packet indicates lower transmission efficiency of the target data packet.

As shown in Table 3, using an Ethernet frame protocol as an example, the target data packet may include a 6-byte destination MAC address, a 6-byte source MAC address, a 2-byte packet type/length, 46- to 1500-byte data, and a 4-byte FCS. The header information of the target data packet includes the destination MAC address, the source MAC address, the packet type, and the packet length. The payload of the target data packet includes the 46- to 1500-byte data. The check information of the data packet includes the 4-byte FCS. It should be understood that the foregoing example is described by using an example in which the target data packet uses the Ethernet frame protocol. However, in an exemplary embodiment, the target data packet may alternatively use another protocol. This is not specifically limited herein.

In this embodiment, as shown in Table 4, the flow entry may include but is not limited to: a match field, a priority, a counter, a flow-entry instruction, an aging time (timeout), an additional attribute (cookie), and a flag. It should be understood that the flow entry shown in Table 4 is merely an example, and should not constitute a specific limitation.

In an exemplary implementation, the match field may be used to carry a specified value for matching the specified value with the header information of the target data packet. For example, the specified value may be at least one of information (a source IP address, a destination IP address, a protocol type, a source port number, and a destination port number) in an IP 5-tuple, or may be at least one of various header fields (a source MAC address, a destination MAC address, and the like) of an Ethernet frame header. It should be noted that the foregoing example of the match field is merely used for description, and should not constitute a specific limitation. In an exemplary embodiment, a flow entry corresponding to the target data packet may be determined by matching the header information of the target data packet with the match field in the flow entry, to obtain a manner of processing the target data packet.

In an exemplary implementation, the flow-entry instruction is used to indicate a manner of processing the target data packet, for example, forwarding, discarding, modification of a packet header, encapsulation, and decapsulation. In an exemplary embodiment, when the header information of the target data packet can match the match field in the flow entry, the flow-entry instruction in the flow entry is correspondingly executed.

In step S405, when the header information of the target data packet matches the match field in the flow entry, the gateway switch executes the flow-entry instruction in the flow entry to discard or buffer the target data packet in the aggregate service flow.

Figure 8:
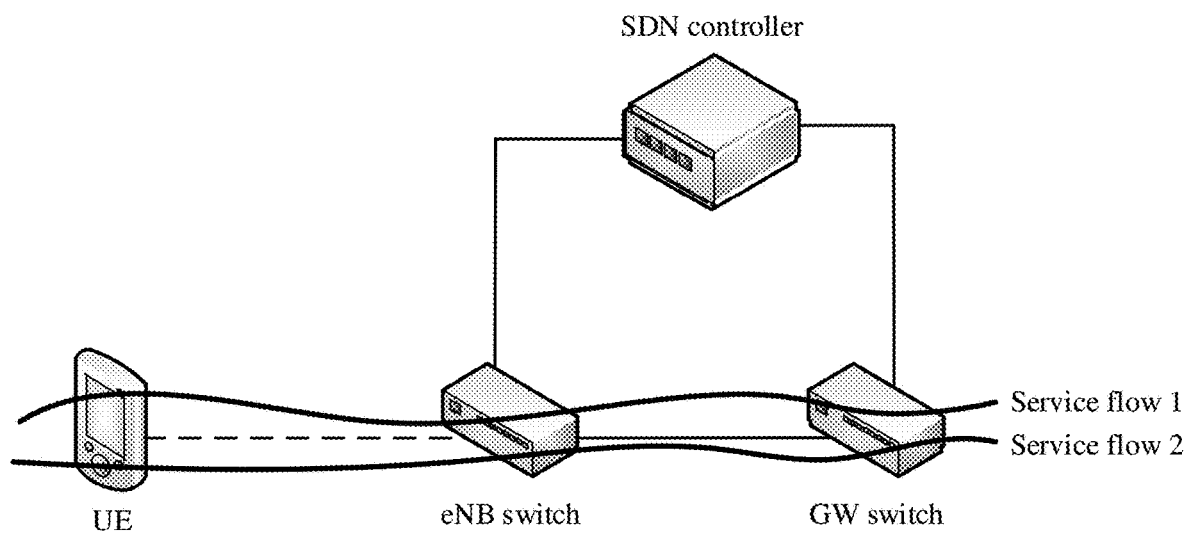
FIG. 8 is a schematic diagram of an exemplary application scenario of the aggregate rate control method shown in FIG. 7.
Figure 9:
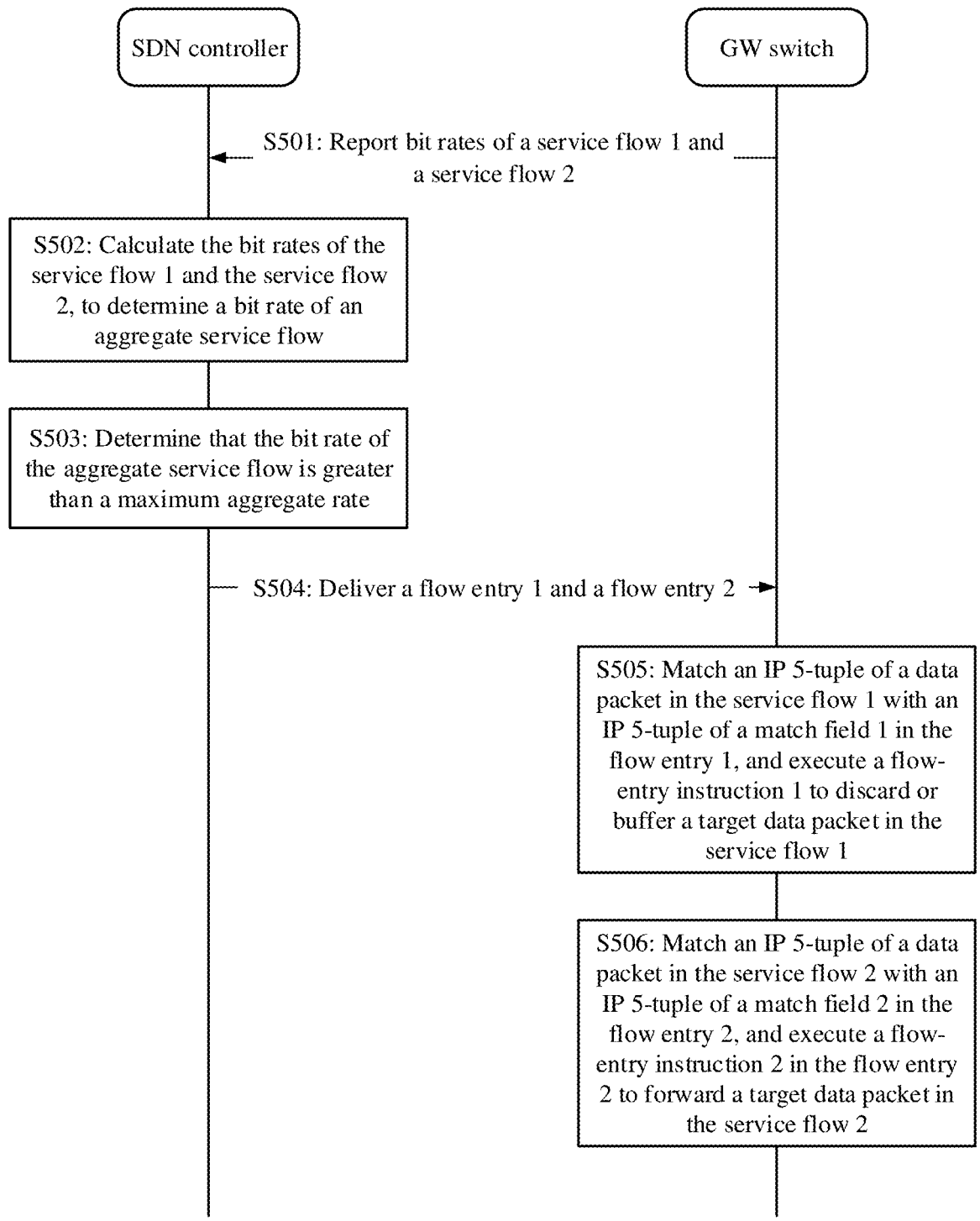
FIG. 9 is a schematic interaction diagram of an exemplary embodiment in which the aggregate rate control method shown in FIG. 7 is used in the application scenario shown in FIG. 8.

The following describes, with reference to an exemplary application scenario in FIG. 8, how to control a maximum aggregate rate by using the aggregate rate control method shown in FIG. 7. It is assumed that an aggregate service flow includes a service flow 1 and a service flow 2, both the service flow 1 and the service flow 2 pass through the same gateway 230, a bit rate of the service flow 1 is 6 Mbit/s, a bit rate of the service flow 2 is 5 Mbit/s, and a QoS control policy is that a maximum aggregate rate of the aggregate service flow is 10 Mbit/s. As shown in FIG. 9, exemplary steps may be as follows:

In step S501, a gateway switch reports bit rates of the service flow 1 and the service flow 2 to an SDN controller. Correspondingly, the SDN controller receives the bit rates that are of the service flow 1 and the service flow 2 and that are reported by the gateway switch.

In step S502, the SDN controller calculates the bit rates of the service flow 1 and the service flow 2, to determine that a bit rate of the aggregate service flow is 11 Mbit/s.

In step S503, the SDN controller determines that the bit rate of the aggregate service flow of 11 Mbit/s is greater than the maximum aggregate rate of 10 Mbit/s.

In step S504, the SDN controller delivers a flow entry 1 and a flow entry 2 to the gateway switch. Correspondingly, the gateway switch receives the flow entry 1 and the flow entry 2 that are delivered by the SDN controller. A match field 1 in the flow entry 1 is an IP 5-tuple of the service flow 1, and a flow-entry instruction 1 is discarding or buffering a target data packet in the service flow 1. A match field 2 in the flow entry 2 is an IP 5-tuple of the service flow 2, and a flow-entry instruction 2 is forwarding a target data packet in the service flow 2.

In step S505, when the service flow 1 passes through the gateway switch, the gateway switch matches an IP 5-tuple of a data packet in the service flow 1 with an IP 5-tuple of the match field 1 in the flow entry 1. Because the IP 5-tuple of the data packet in the service flow 1 matches the IP 5-tuple of the match field 1 in the flow entry 1, the gateway switch executes the flow-entry instruction 1 in the flow entry 1 to discard or buffer the target data packet in the service flow 1.

In step S506, when the service flow 2 passes through the gateway switch, the gateway switch matches an IP 5-tuple of a data packet in the service flow 2 with an IP 5-tuple of the match field 2 in the flow entry 2. Because the IP 5-tuple of the data packet in the service flow 2 matches the IP 5-tuple of the match field 2 in the flow entry 2, the gateway switch executes the flow-entry instruction 2 in the flow entry 2 to forward the target data packet in the service flow 2.

Figure 10:
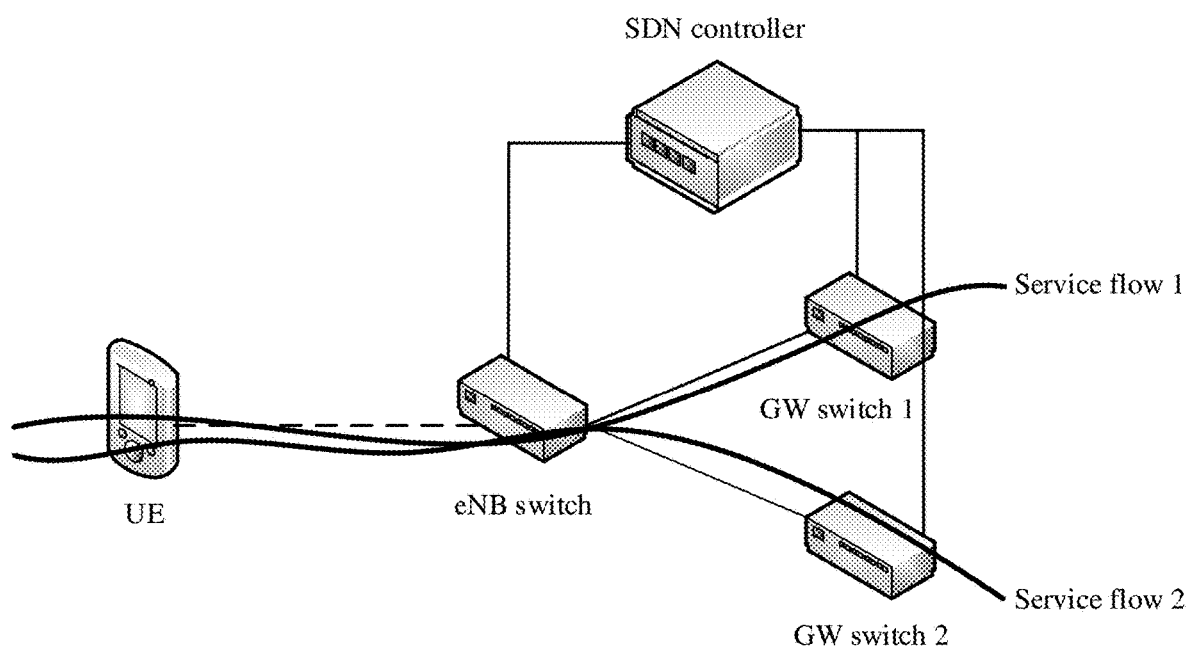
FIG. 10 is a schematic diagram of another exemplary application scenario of the aggregate rate control method shown in FIG. 7.
Figure 11:
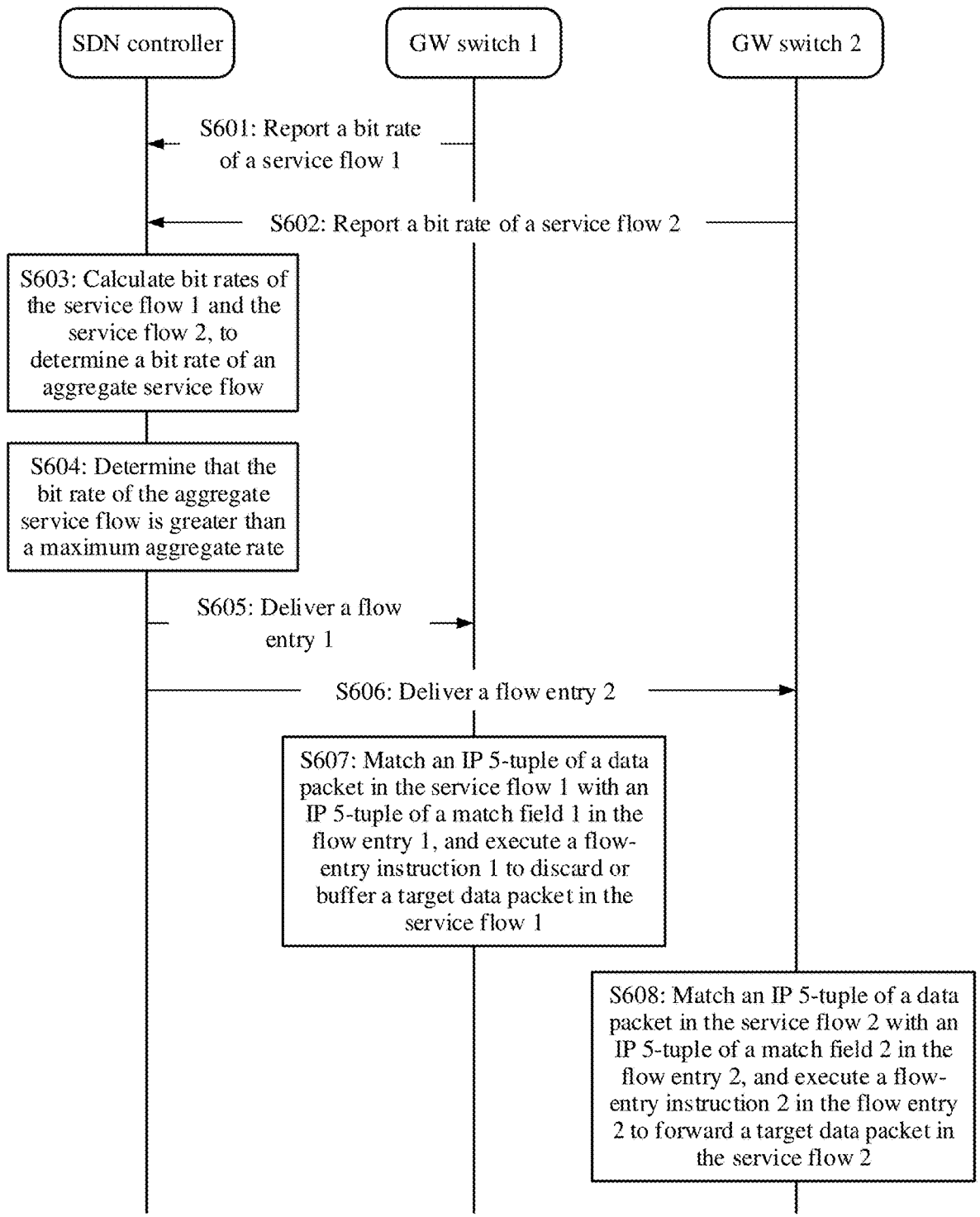
FIG. 11 is a schematic interaction diagram of an exemplary embodiment in which the aggregate rate control method shown in FIG. 7 is used in the application scenario shown in FIG. 10.

The following describes, with reference to an exemplary application scenario in FIG. 10, how to control a maximum aggregate rate by using the aggregate rate control method shown in FIG. 7. It is assumed that an aggregate service flow includes a service flow 1 and a service flow 2, the service flow 1 passes through a gateway switch 1, the service flow 2 passes through a gateway switch 2, a bit rate of the service flow 1 is 6 Mbit/s, a bit rate of the service flow 2 is 5 Mbit/s, and a QoS control policy is that a maximum aggregate rate of the aggregate service flow is 10 Mbit/s. As shown in FIG. 11, exemplary steps may be as follows:

In step S601, the gateway switch 1 reports the bit rate of the service flow 1 to an SDN controller. Correspondingly, the SDN controller receives the bit rate that is of the service flow 1 and that is reported by the gateway switch 1.

In step S602, the gateway switch 2 reports the bit rate of the service flow 2 to the SDN controller. Correspondingly, the SDN controller receives the bit rate that is of the service flow 2 and that is reported by the gateway switch 2.

In step S603, the SDN controller calculates the bit rates of the service flow 1 and the service flow 2, to determine that a bit rate of the aggregate service flow is 11 Mbit/s.

In step S604, the SDN controller determines that the bit rate of the aggregate service flow of 11 Mbit/s is greater than the maximum aggregate rate of 10 Mbit/s.

In step S605, the SDN controller delivers a flow entry 1 to the gateway switch 1. Correspondingly, the gateway switch 1 receives the flow entry 1 delivered by the SDN controller. A match field 1 in the flow entry 1 is an IP 5-tuple of the service flow 1, and a flow-entry instruction 1 is discarding or buffering a target data packet in the service flow 1.

In step S606, the SDN controller delivers a flow entry 2 to the gateway switch 2. Correspondingly, the gateway switch 2 receives the flow entry 2 delivered by the SDN controller. A match field 2 in the flow entry 2 is an IP 5-tuple of the service flow 2, and a flow-entry instruction 2 is forwarding a target data packet in the service flow 2.

In step S607, when the service flow 1 passes through the gateway switch 1, the gateway switch 1 matches an IP 5-tuple of a data packet in the service flow 1 with an IP 5-tuple of the match field 1 in the flow entry 1. Because the IP 5-tuple of the data packet in the service flow 1 matches the IP 5-tuple of the match field 1 in the flow entry 1, the gateway switch 1 executes the flow-entry instruction 1 in the flow entry 1 to discard or buffer the target data packet in the service flow 1.

In step S608, when the service flow 2 passes through the gateway switch 2, the gateway switch 2 matches an IP 5-tuple of a data packet in the service flow 2 with an IP 5-tuple of the match field 2 in the flow entry 2. Because the IP 5-tuple of the data packet in the service flow 2 matches the IP 5-tuple of the match field 2 in the flow entry 2, the gateway switch 2 executes the flow-entry instruction 2 in the flow entry 2 to forward the target data packet in the service flow 2.

The following describes in detail several exemplary embodiments in which the gateway switch discards or buffers a data packet in the aggregate rate control methods shown in FIG. 5 to FIG. 11.

In the first embodiment, the gateway switch directly discards or buffers a target data packet. In this implementation, the gateway switch does not need to consider a level of the target data packet. As long as a bit rate of an aggregate service flow is greater than a specified maximum aggregate rate, the gateway switch immediately discards or buffers the target data packet, to reduce the bit rate of the aggregate service flow to the maximum aggregate rate as soon as possible. For example, the aggregate service flow includes a service flow 1 and a service flow 2, a priority of the service flow 1 is 1, and a priority of the service flow 2 is 5. When the bit rate of the aggregate service flow is greater than the specified maximum aggregate rate, the gateway switch discards or buffers target data packets in the service flow 1 and the service flow 2.

In the second embodiment, the gateway switch discards or buffers the target data packet according to a packet discarding or buffering policy. In this implementation, the packet discarding or buffering policy may be a user-defined policy, for example, may be a lowest priority policy or a specified priority policy. It should be noted that the example of the packet discarding or buffering policy is merely for description, and should not constitute a specific limitation.

When the packet discarding or buffering policy is the lowest priority policy, the gateway switch discards or buffers the target data packet when a priority of the target data packet is lower than a priority of another data packet in the aggregate service flow, to ensure that a data packet with a higher priority can be transmitted first. For example, the aggregate service flow includes a service flow 1 and a service flow 2, a priority of the service flow 1 is 1, and a priority of the service flow 2 is 5. When the bit rate of the aggregate service flow is greater than a specified maximum aggregate rate, the gateway switch discards or buffers all target data packets in the service flow 2. Certainly, after all the target data packets in the service flow 2 are discarded or buffered, if the bit rate of the aggregate service flow is still greater than the specified maximum aggregate rate, all target data packets in the service flow 1 may further be discarded or buffered.

When the packet discarding or buffering policy is the specified priority policy, the gateway switch discards or buffers the target data packet when a priority of the target data packet is a specified priority. In this way, the bit rate of the aggregate service flow can be reduced to the maximum aggregate rate as soon as possible without comparing priorities of data packets in the aggregate service flow. For example, the aggregate service flow includes a service flow 1 and a service flow 2, a priority of the service flow 1 is 1, a priority of the service flow 2 is 5, and it is specified that a service flow with a priority of 5 is discarded or buffered. When the bit rate of the aggregate service flow is greater than the specified maximum aggregate rate, the gateway switch discards or buffers all target data packets in the service flow 2. Certainly, after all the target data packets in the service flow 2 are discarded or buffered, if the bit rate of the aggregate service flow is still greater than the specified maximum aggregate rate, all target data packets in the service flow 1 may further be discarded or buffered.

In an exemplary embodiment, the gateway switch may further use a plurality of packet discarding or buffering policies in combination. For example, the gateway switch may use the lowest priority policy in combination with the specified priority policy. For example, the gateway switch first discards or buffers the target data packet according to the specified priority policy, and then the gateway switch discards or buffers the target data packet according to the lowest priority policy. For example, the aggregate service flow includes a service flow 1 and a service flow 2, a priority of the service flow 1 is 1, a priority of the service flow 2 is 3, and it is specified that a service flow with a priority of 5 is discarded or buffered. When the bit rate of the aggregate service flow is greater than the specified maximum aggregate rate, the gateway switch first searches for a data packet in the service flow with a priority of 5 according to the specified priority policy, and discards or buffers the data packet. When there is no service flow with a priority of 5, the gateway switch then discards or buffers a target data packet in the service flow 2 with a lower priority according to the lowest priority policy. After discarding or buffering all target data packets in the service flow 2, if the bit rate of the aggregate service flow is still greater than the specified maximum aggregate rate, all target data packets in the service flow 1 with a higher priority may further be discarded or buffered.

If the gateway buffers the target data packet in a memory of the gateway gateway, after the bit rate of the aggregate service flow decreases and is less than the maximum aggregate bit rate, the gateway may retransmit the target data packet buffered in the memory of the gateway. The following describes several embodiments in which the gateway retransmits the buffered target data packet from two perspectives: a retransmission path and a retransmission sequence.

From the Perspective of a Retransmission Path:

In the first embodiment, the gateway switch retransmits the target data packet along a user plane path existing before buffering. It is assumed that an OpenFlow network includes UE, an eNB switch, a gateway switch 1, a gateway switch 2, a gateway switch 3, and a gateway switch 4. Before buffering, the target data packet is transmitted along a user plane path from the UE, the eNB switch, the gateway switch 1, to the gateway switch 2. After the buffering, the target data packet is still transmitted along the user plane path from the UE, the eNB switch, the gateway switch 1, to the gateway switch 2.

In the second embodiment, the gateway switch retransmits the target data packet along a newly established user plane path. It is assumed that an OpenFlow network includes UE, an eNB switch, a gateway switch 1, a gateway switch 2, a gateway switch 3, and a gateway switch 4. Before buffering, the target data packet is transmitted along a user plane path from the UE, the eNB switch, the gateway switch 1, to the gateway switch 2. After the buffering, the target data packet may be transmitted along a newly established user plane path from the UE, the eNB switch, the gateway switch 3, to the gateway switch 4.

From the Perspective of a Retransmission Sequence:

In the first embodiment, the gateway switch directly retransmits the target data packet. In this implementation, the gateway switch does not need to consider a level of the target data packet. As long as a bit rate of an aggregate service flow is reduced and is less than a specified maximum aggregate rate, the gateway switch immediately retransmits the target data packet, to retransmit the buffered target data packet as soon as possible. For example, buffered target data packets include a target data packet in a service flow 1 and a target data packet in a service flow 2, a priority of the service flow 1 is 1, and a priority of the service flow 2 is 5. When the bit rate of the aggregate service flow decreases and is less than the maximum aggregate rate, the gateway switch retransmits target data packets in the service flow 1 and the service flow 2.

In the second embodiment, when a priority of the target data packet is higher than a priority of another buffered data packet, the gateway switch retransmits the target data packet. In this implementation, the gateway switch preferentially retransmits a target data packet with a higher priority, to reduce a transmission delay of the data packet with a higher priority. For example, buffered target data packets include a target data packet in a service flow 1 and a target data packet in a service flow 2, a priority of the service flow 1 is 1, and a priority of the service flow 2 is 5. When the bit rate of the aggregate service flow decreases and is less than the maximum aggregate rate, the gateway switch preferentially retransmits all target data packets in the service flow 1. After all the target data packets in the service flow 1 are retransmitted, the gateway switch retransmits all target data packets in the service flow 2.

Figure 12:
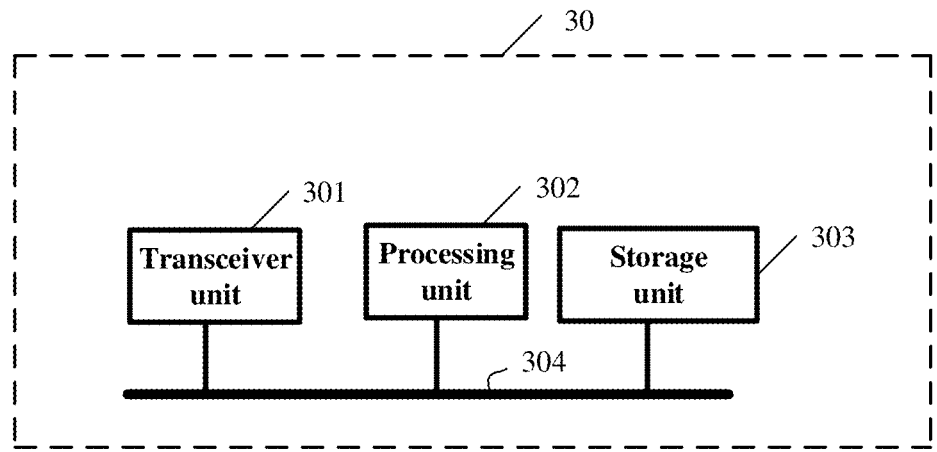
FIG. 12 is a schematic structural diagram of an apparatus according to an embodiment.

Based on the same concept as the aggregate rate control method shown in FIG. 5, an embodiment further provides an apparatus (as shown in FIG. 12). The apparatus is configured to implement the method described in the embodiment in FIG. 5. As shown in FIG. 12, an apparatus 30 includes a transceiver unit 301, a processing unit 302, and a storage unit 303. The transceiver unit 301, the processing unit 302, and the storage unit 303 may be connected by using a bus or in another manner (an example in which the transceiver unit 301, the processing unit 302, and the storage unit 303 are connected by using a bus is used in FIG. 12).

The transceiver unit 301 is configured to implement content exchange between the processing unit 302 and another unit or network element. For example, the transceiver unit 301 may be a communications interface of the apparatus, or may be a transceiver circuit or a transceiver, or may be a transceiver machine. The transceiver unit 301 may alternatively be a communications interface or a transceiver circuit of the processing unit 302. Optionally, the transceiver unit 301 may be a transceiver chip.

The processing unit 302 is configured to implement data processing by the apparatus. The processing unit 302 may be a processing circuit or may be a processor. The processor may be a central processing unit (CPU), a network processor, or a combination of a CPU and a network processor. The processor 302 may be a general purpose processor, a digital signal processor, an application-specific integrated circuit (ASIC), a field programmable gate array (FPGA) or another programmable logic device (PLD), a discrete gate or a transistor logic device, or a discrete hardware component. The processor may further include a hardware chip. The hardware chip may be an ASIC, a PLD, or a combination thereof. The PLD may be a complex programmable logic device (CPLD), an FPGA, generic array logic (GAL), or any combination thereof. In an implementation process, the steps in the foregoing methods may be completed by using an integrated logic circuit of hardware in the processing unit 302 or an instruction in a form of software. The processing unit 302 may implement or execute the methods, steps, and logical block diagrams disclosed in the embodiments. The general purpose processor may be a microprocessor, or the processor may be any conventional processor or the like. Steps in the methods disclosed with reference to the embodiments may be directly executed and implemented by a hardware decoding processor, or may be executed and implemented by using a combination of hardware and software modules in the decoding processor. A software module may be located in a mature storage medium in the art, such as a random access memory (RAM), a flash memory, a read-only memory (ROM), a programmable read-only memory (PROM), an electrically erasable programmable memory (EEPROM), or a register.

The storage unit 303 is configured to store a computer instruction executed by the processing unit 302. The storage unit 303 may be a storage circuit or may be a memory. The memory may be a volatile memory or a nonvolatile memory, or may include a volatile memory and a nonvolatile memory. The nonvolatile memory may be a ROM, a PROM, an erasable programmable read-only memory (EPROM), an EEPROM, or a flash memory. The volatile memory may be a RAM, used as an external cache.

When the apparatus 30 is a first network device, program code stored in the storage unit 303 may be used to implement the functions of the gateway switch in the embodiment shown in FIG. 5. For example, the processing unit 302 is configured to invoke the program code stored in the storage unit 303, and the following steps are performed:

receiving, by the transceiver unit 301, a flow entry and a link table from an SDN controller, where the flow entry includes at least a match field and a flow-entry instruction, and the link table includes at least a packet processing operation;

parsing to obtain header information of a received target data packet, and matching the header information with the match field in the flow entry;

when the packet information matches the match field in the flow entry, executing a link instruction in the flow-entry instruction in the flow entry, where the link instruction is used to point to the link table; and performing the packet processing operation in the link table, where the packet processing operation is used to discard or buffer the target data packet when a bit rate of an aggregate service flow is greater than a specified maximum aggregate rate.

Optionally, the processing unit 302 may be configured to: directly discard or buffer the target data packet; or discard or buffer the target data packet according to a packet discarding or buffering policy.

Optionally, the processing unit 302 may be configured to: discard or buffer the target data packet when a priority of the target data packet is lower than a priority of another data packet in the aggregate service flow; or discard or buffer the target data packet when a priority of the target data packet is a specified priority.

Optionally, in a case of buffering the target data packet, after the target data packet is buffered, the processing unit 302 is further configured to: when the bit rate of the aggregate service flow decreases and is less than the specified maximum aggregate rate, retransmit the target data packet by using transceiver unit 301.

Optionally, the transceiver unit 301 is further configured to: retransmit the target data packet along a user plane path existing before buffering; or retransmit the target data packet along a newly established user plane path.

Optionally, the transceiver unit 301 is further configured to: directly retransmit the target data packet; or retransmit the target data packet when a priority of the target data packet is higher than a priority of another buffered data packet.

Optionally, the link table includes at least a link table identifier, the maximum aggregate rate, and the packet processing operation.

It should be noted that when the apparatus 30 is the first network device, for steps performed by the processing unit 302 and other technical features related to the processing unit 302, refer to related content of the gateway switch in the method embodiment in FIG. 5. Details are not described herein again.

When the apparatus 30 is a second network device, the program code stored in the storage unit 303 may be used to implement the function of the SDN controller in the embodiment shown in FIG. 5. For example, the processing unit 302 is configured to invoke the program code stored in the storage unit 303, and the following steps are performed:

generating a flow entry and a link table according to a QoS control policy, where the flow entry includes at least a match field and a flow-entry instruction, the flow-entry instruction includes at least a link instruction, the link instruction is used to point to the link table, the link table includes at least a packet processing operation, and the packet processing operation is used to discard or buffer a target data packet when a bit rate of an aggregate service flow is greater than a specified maximum aggregate rate; and sending the flow entry and the link table to a gateway switch.

Optionally, the discarding or buffering the target data packet may include: directly discarding or buffering the target data packet; or discarding or buffering the target data packet according to a packet discarding or buffering policy.

Optionally, the discarding or buffering the target data packet according to a packet discarding or buffering policy includes: discarding or buffering the target data packet when a priority of the target data packet is lower than a priority of another data packet in the aggregate service flow; or discarding or buffering the target data packet when a priority of the target data packet is a specified priority.

It should be noted that when the apparatus 30 is the second network device, for steps performed by the processing unit 302 and other technical features related to the processing unit 302, refer to related content of the SDN controller in the method embodiment in FIG. 5. Details are not described herein again.

Based on the same concept as the aggregate rate control method shown in FIG. 7, an embodiment further provides an apparatus (as shown in FIG. 12). The apparatus is configured to implement the method described in the embodiment in FIG. 7. As shown in FIG. 12, an apparatus 30 includes a transceiver unit 301, a processing unit 302, and a storage unit 303. The transceiver unit 301, the processing unit 302, and the storage unit 303 may be connected by using a bus or in another manner (an example in which the transceiver unit 301, the processing unit 302, and the storage unit 303 are connected by using a bus is used in FIG. 12).

The transceiver unit 301 is configured to implement content exchange between the processing unit 302 and another unit or network element. For example, the transceiver unit 301 may be a communications interface of the apparatus, or may be a transceiver circuit or a transceiver, or may be a transceiver machine. The transceiver unit 301 may alternatively be a communications interface or a transceiver circuit of the processing unit 302. Optionally, the transceiver unit 301 may be a transceiver chip.

The processing unit 302 is configured to implement data processing by the apparatus. The processing unit 302 may be a processing circuit or may be a processor. The processor may be a CPU, a network processor, or a combination of the CPU and the network processor. The processor 302 may be a general purpose processor, a digital signal processor, an ASIC, an FPGA or another PLD, a discrete gate or a transistor logic device, or a discrete hardware component. The processor may further include a hardware chip. The hardware chip may be an ASIC, a PLD, or a combination thereof. The PLD may be a CPLD, an FPGA, GAL, or any combination thereof. In an implementation process, the steps in the foregoing methods may be completed by using an integrated logic circuit of hardware in the processing unit 302 or an instruction in a form of software. The processing unit 302 may implement or execute the methods, steps, and logical block diagrams disclosed in the embodiments. The general purpose processor may be a microprocessor, or the processor may be any conventional processor or the like. Steps in the methods disclosed with reference to the embodiments may be directly executed and implemented by a hardware decoding processor, or may be executed and implemented by using a combination of hardware and software modules in the decoding processor. A software module may be located in a mature storage medium known in the art, such as a RAM, a flash memory, a ROM, a PROM, an EEPROM, or a register.

The storage unit 303 is configured to store a computer instruction executed by the processing unit 302. The storage unit 303 may be a storage circuit or may be a memory. The memory may be a volatile memory or a nonvolatile memory, or may include a volatile memory and a nonvolatile memory. The nonvolatile memory may be a ROM, a PROM, an EPROM, an EEPROM, or a flash memory. The volatile memory may be a RAM, used as an external cache.

When the apparatus 30 is a first network device, program code stored in the storage unit 303 may be used to implement the functions of the gateway switch in the embodiment shown in FIG. 7. For example, the processing unit 302 is configured to invoke the program code stored in the storage unit 303, and the following steps are performed:

reporting, by the transceiver unit 301, a bit rate of an aggregate service flow to an SDN controller;

receiving, by the transceiver unit 301, a flow entry returned by the SDN controller based on the bit rate of the aggregate service flow, where the flow entry is used to instruct the gateway switch to discard or buffer a target data packet in the aggregate service flow, so that the aggregate service flow shares a maximum aggregate rate; and executing, by the processing unit 302, a flow-entry instruction in the flow entry to discard or buffer the target data packet.

Optionally, the flow entry is used to instruct the gateway switch to directly discard or buffer the target data packet; or the flow entry is used to instruct the gateway switch to discard or buffer the target data packet when a priority of the target data packet is lower than a priority of a data packet in the aggregate service flow.

Optionally, when the flow entry is used to instruct the gateway switch to buffer the target data packet, when the bit rate of the aggregate service flow decreases and is less than the aggregate bit rate, the transceiver unit 301 retransmits the buffered target data packet.

Optionally, the transceiver unit 301 retransmits the buffered target data packet along a user plane path existing before buffering, or retransmits the buffered target packet along a newly established user plane path, where the user plane path is a path, along which the gateway switch sends the target data packet on a user plane.

Optionally, when a priority of the target data packet is higher than a priority of another buffered data packet, the transceiver unit 301 retransmits the buffered target data packet.

It should be noted that when the apparatus 30 is the first network device, for steps performed by the processing unit 302 and other technical features related to the processing unit 302, refer to related content of the gateway switch in the method embodiment in FIG. 7. Details are not described herein again.

When the apparatus 30 is a second network device, the program code stored in the storage unit 303 may be used to implement the functions of the SDN controller in the embodiment shown in FIG. 7. For example, the processing unit 302 is configured to invoke the program code stored in the storage unit 303, and the following steps are performed:

receiving a bit rate that is of an aggregate service flow and that is reported by a gateway switch;

determining that the bit rate of the aggregate service flow is greater than a maximum aggregate rate; and when the bit rate of the aggregate service flow is greater than the maximum aggregate rate, delivering a flow entry to the gateway switch, where the flow entry is used to instruct the gateway switch to discard or buffer a target data packet in the aggregate service flow, so that the aggregate service flow shares the maximum aggregate rate.

Optionally, when the flow entry is used to instruct the gateway switch to discard or buffer the target data packet, the flow entry is used to instruct the gateway switch to directly discard or buffer the target data packet; or the flow entry is used to instruct the gateway switch to discard or buffer the target data packet when a priority of the target data packet is lower than a priority of a data packet in the aggregate service flow.

Optionally, when the flow entry is used to instruct the gateway switch to buffer the target data packet, the processor unit 302 is further configured to: when the bit rate of the aggregate service flow decreases and is less than the aggregate bit rate, instruct the gateway switch to retransmit the buffered target data packet.

Optionally, the processing unit 302 is further configured to: instruct the gateway switch to retransmit the buffered target data packet along a user plane path existing before buffering; or instruct the gateway switch to retransmit the buffered target packet along a newly established user plane path, where the user plane path is a path, along which the gateway switch sends the target data packet on a user plane.

Optionally, the processing unit 302 is further configured to instruct the gateway switch to retransmit the buffered target data packet when a priority of the target data packet is higher than a priority of another buffered data packet.

It should be noted that when the apparatus 30 is the second network device, for steps performed by the processing unit 302 and other technical features related to the processing unit 302, refer to related content of the SDN controller in the method embodiment in FIG. 7. Details are not described herein again.

Figure 13:
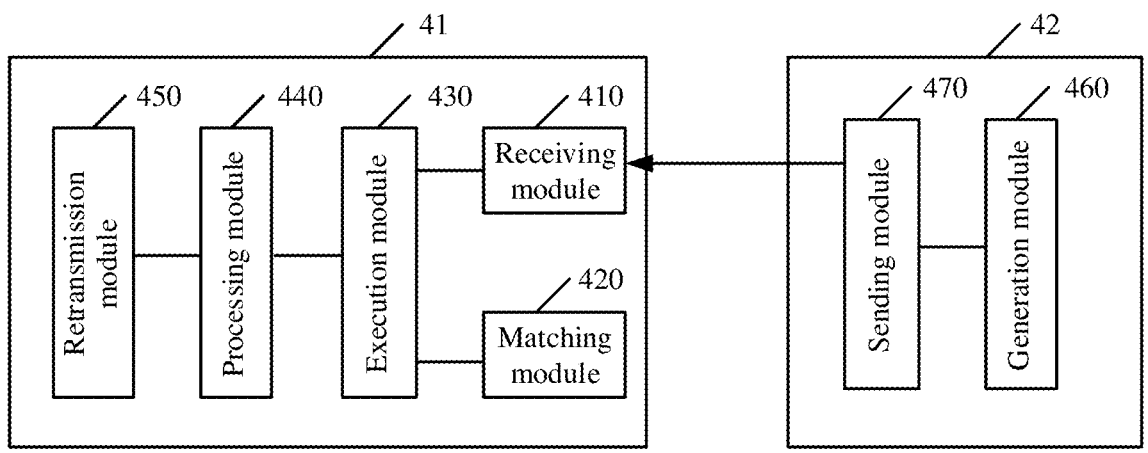
FIG. 13 is a schematic structural diagram of a communications system according to an embodiment.

Based on the same concept as the aggregate rate control method shown in FIG. 5, an embodiment further provides a first network device (as shown in FIG. 13) and a second network device (as shown in FIG. 13). The first network device is configured to perform the functions of the gateway switch in the aggregate rate control method described in the embodiment in FIG. 5, and the second network device is configured to perform the functions of the SDN controller in the aggregate rate control method described in the embodiment in FIG. 5.

Referring to FIG. 13, a first network device 41 in this embodiment includes a receiving module 410, a matching module 420, an execution module 430, and a processing module 440.

The receiving module 410 is configured to receive a flow entry and a link table from an SDN controller, where the flow entry includes at least a match field and a flow-entry instruction, and the link table includes at least a packet processing operation.

The matching module 420 is configured to: parse to obtain header information of a received target data packet, and match the header information with the match field in the flow entry.

The execution module 430 is configured to: when the header information matches the match field in the flow entry, execute a link instruction in the flow-entry instruction in the flow entry, where the link instruction is used to point to the link table.

The processing module 440 is configured to perform the packet processing operation in the link table, where the packet processing operation is used to discard or buffer the target data packet when a bit rate of an aggregate service flow is greater than a specified maximum aggregate rate.

Optionally, the processing module 440 is configured to: directly discard or buffer the target data packet; or discard or buffer the target data packet according to a packet discarding or buffering policy.

Optionally, the processing module 440 is configured to: discard or buffer the target data packet when a priority of the target data packet is lower than a priority of another data packet in the aggregate service flow; or discard or buffer the target data packet when a priority of the target data packet is a specified priority.

Optionally, the gateway switch further includes a retransmission module 450. The retransmission module 450 is configured to retransmit the target data packet when the bit rate of the aggregate service flow is reduced and is less than the specified maximum aggregate rate.

Optionally, the retransmission module 450 is further configured to: retransmit the target data packet along a user plane path existing before buffering; or retransmit the target data packet along a newly established user plane path.

Optionally, the retransmission module 450 is further configured to: directly retransmit the target data packet; or retransmit the target data packet when a priority of the target data packet is higher than a priority of another buffered data packet.

Optionally, the link table includes at least a link table identifier, the maximum aggregate rate, and the packet processing operation.

It should be noted that, according to detailed descriptions of the embodiment in FIG. 5, a person skilled in the art may clearly know an implementation method of each function module included in the first network device 41. Therefore, for brevity, details are not described herein again.

Referring to FIG. 13, a second network device 42 in this embodiment includes a generation module 460 and a sending module 470.

The generation module 460 is configured to generate a flow entry and a link table according to a QoS control policy, where the flow entry includes at least a match field and a flow-entry instruction, the flow-entry instruction includes at least a link instruction, the link instruction is used to point to the link table, the link table includes at least a packet processing operation, and the packet processing operation is used to discard or buffer a target data packet when a bit rate of an aggregate service flow is greater than a specified maximum aggregate rate.

The sending module 470 is configured to send the flow entry and the link table to a gateway switch.

Optionally, the discarding or buffering the target data packet may include: directly discarding or buffering the target data packet; or discarding or buffering the target data packet according to a packet discarding or buffering policy.

Optionally, the discarding or buffering the target data packet according to a packet discarding or buffering policy includes: discarding or buffering the target data packet when a priority of the target data packet is lower than a priority of another data packet in the aggregate service flow; or discarding or buffering the target data packet when a priority of the target data packet is a specified priority.

It should be noted that, according to detailed descriptions of the embodiment in FIG. 5, a person skilled in the art may clearly know an implementation method of each function module included in the second network device 42. Therefore, for brevity, details are not described herein again.

Figure 14:
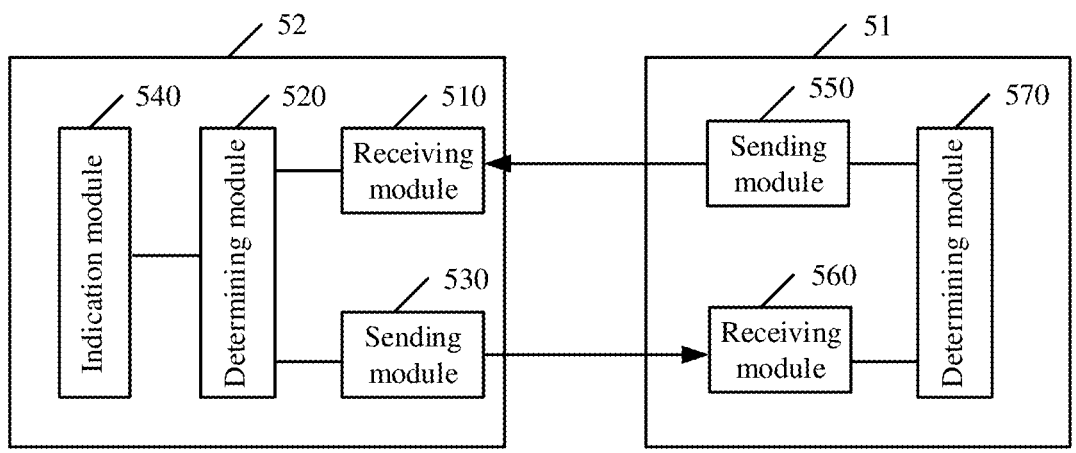
FIG. 14 is a schematic structural diagram of another communications system according to an embodiment.

Based on the same concept as the aggregate rate control method shown in FIG. 7, an embodiment further provides a first network device (as shown in FIG. 14) and a second network device (as shown in FIG. 14). The first network device is configured to perform the functions of the gateway switch in the aggregate rate control method described in the embodiment in FIG. 7, and the second network device is configured to perform the functions of the SDN controller in the aggregate rate control method described in the embodiment in FIG. 7.

Referring to FIG. 14, a second network device 52 in this embodiment includes a receiving module 510, a determining module 520, and a sending module 530.

The receiving module 510 is configured to receive a bit rate that is of an aggregate service flow and that is reported by a gateway switch.

The determining module 520 is configured to determine that the bit rate of the aggregate service flow is greater than a maximum aggregate rate.

The sending module 530 is configured to: when the bit rate of the aggregate service flow is greater than a maximum aggregate rate, deliver a flow entry to the gateway switch, where the flow entry is used to instruct the gateway switch to discard or buffer a target data packet in the aggregate service flow, so that the aggregate service flow shares the maximum aggregate rate.

Optionally, when the flow entry is used to instruct the gateway switch to discard or buffer the target data packet, the flow entry is used to instruct the gateway switch to directly discard or buffer the target data packet; or the flow entry is used to instruct the gateway switch to discard or buffer the target data packet when a priority of the target data packet is lower than a priority of a data packet in the aggregate service flow.

Optionally, when the flow entry is used to instruct the gateway switch to buffer the target data packet, the SDN controller further includes an indication module 540, where the indication module is configured to: when the bit rate of the aggregate service flow decreases and is less than the aggregate bit rate, instruct the gateway switch to retransmit the buffered target data packet.

Optionally, the indication module 540 is further configured to: instruct the gateway switch to retransmit the buffered target data packet along a user plane path existing before buffering; or instruct the gateway switch to retransmit the buffered target packet along a newly established user plane path, where the user plane path is a path, along which the gateway switch sends the target data packet on a user plane.

Optionally, the indication module 540 is further configured to instruct the gateway switch to retransmit the buffered target data packet when a priority of the target data packet is higher than a priority of another buffered data packet.

It should be noted that, according to detailed descriptions of the embodiment in FIG. 7, a person skilled in the art may clearly know an implementation method of each function module included in the second network device 51. Therefore, for brevity, details are not described herein again.

Referring to FIG. 14, a first network device 52 in this embodiment includes a sending module 550, a receiving module 560, and an execution module 570.

The sending module 550 is configured to report a bit rate of an aggregate service flow to an SDN controller.

The receiving module 560 is configured to receive a flow entry returned by the SDN controller based on the bit rate of the aggregate service flow, where the flow entry is used to instruct the gateway switch to discard or buffer a target data packet in the aggregate service flow, so that the aggregate service flow shares a maximum aggregate rate.

The execution module 570 is configured to execute a flow-entry instruction in the flow entry to discard or buffer the target data packet.

Optionally, that the flow entry is used to instruct the gateway switch to discard or buffer the target data packet includes: the flow entry is used to instruct the gateway switch to directly discard or buffer the target data packet; or the flow entry is used to instruct the gateway switch to discard or buffer the target data packet when a priority of the target data packet is lower than a priority of a data packet in the aggregate service flow.

Optionally, when the flow entry is used to instruct the gateway switch to buffer the target data packet, the sending module 550 is further configured to retransmit the buffered target data packet when the bit rate of the aggregate service flow decreases and is less than the aggregated bit rate.

Optionally, the sending module 550 is further configured to: retransmit the buffered target data packet along a user plane path existing before buffering; or retransmit the buffered target packet along a newly established user plane path, where the user plane path is a path, along which the gateway switch sends the target data packet on a user plane.

Optionally, the sending module 550 is further configured to retransmit the buffered target data packet when a priority of the target data packet is higher than a priority of another buffered data packet.

It should be noted that, according to detailed descriptions of the embodiment in FIG. 7, a person skilled in the art may clearly know an implementation method of each function module included in the first network device 52. Therefore, for brevity, details are not described herein again.

In addition, an embodiment further provides a communications system. The communications system includes a first network device and a second network device. The first network device corresponds to the gateway switch in the method embodiment in FIG. 5. The second network device corresponds to the SDN controller in the method embodiment in FIG. 5.

In an exemplary implementation, the first network device may be the first network device represented by the apparatus shown in FIG. 12, and the second network device may be the second network device shown in FIG. 12. The first network device may be the first network device 41 shown in FIG. 13, and the second network device may be the second network device 42 shown in FIG. 13.

In addition, an embodiment further provides a communications system. The communications system includes a first network device and a second network device. The first network device corresponds to the gateway switch in the method embodiment in FIG. 7. The second network device corresponds to the SDN controller in the method embodiment in FIG. 7.

In an exemplary implementation, the first network device may be the first network device represented by the apparatus shown in FIG. 12, and the second network device may be the second network device represented by the apparatus shown in FIG. 12. The first network device may be the first network device 51 shown in FIG. 14, and the second network device may be the second network device 51 shown in FIG. 14.

In the several embodiments provided herein, it should be understood that the disclosed system, terminal, and method may be implemented in other manners. For example, the described apparatus embodiment is merely an example. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, function units in the embodiments may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions essentially, or the part contributing to the prior art, or all or some of the technical solutions may be implemented in a form of a software product. The software product is stored in a storage medium and includes several instructions for instructing a computer device (which may be a personal computer, a server, a network device, or the like) to perform all or some of the steps of the methods described in the embodiments. The foregoing storage medium includes: any medium that can store program code, such as a USB flash drive, a removable hard disk, a ROM, a RAM, a magnetic disk, or an optical disc.

The foregoing descriptions are merely exemplary embodiments, but are not intended to limit the protection scope. Any equivalent modification or replacement readily figured out by a person skilled in the art within the technical scope disclosed herein shall fall within the protection scope. Therefore, the protection scope shall be subject to the protection scope of the claims.

What is claimed is:

1. An aggregate rate control method, comprising:
   receiving, by a gateway switch, a flow entry and a link table from a software-defined networking (SDN) controller, wherein the flow entry includes at least a match field and a flow-entry instruction, and the link table includes at least a packet processing operation;
   parsing, by the gateway switch, to obtain header information of a received target data packet, and matching the header information with the match field in the flow entry;
   executing, by the gateway switch, a link instruction in the flow-entry instruction in the flow entry, wherein the link instruction is used to point to the link table; and
   performing, by the gateway switch, the packet processing operation in the link table, wherein the packet processing operation is used to discard or buffer the target data packet when a bit rate of an aggregate service flow is greater than a specified maximum aggregate rate.

2. The method according to claim 1, wherein the discarding or buffering the target data packet comprises:
   directly discarding or buffering the target data packet; or
   discarding or buffering the target data packet according to a packet discarding or buffering policy.

3. The method according to claim 2, wherein the discarding or buffering the target data packet according to a packet discarding or buffering policy further comprises:

discarding or buffering the target data packet when a priority of the target data packet is lower than a priority of another data packet in the aggregate service flow; or discarding or buffering the target data packet when a priority of the target data packet is a specified priority.

4. The method according to claim 1, further comprising:

generating, by the SDN controller, the flow entry and the link table according to a quality of service (QoS) control policy; and sending, by the SDN controller, the flow entry and the link table to the gateway switch.

5. An apparatus for aggregate rate control, comprising:

at least one processor coupled with a memory, wherein the at least one processor is configured to execute instructions stored in the memory, to enable the apparatus to perform the following operations:

receiving a flow entry and a link table from a software-defined networking (SDN) controller, wherein the flow entry includes at least a match field and a flow-entry instruction, and the link table includes at least a packet processing operation;

parsing to obtain header information of a received target data packet, and matching the header information with the match field in the flow entry;

executing a link instruction in the flow-entry instruction in the flow entry, wherein the link instruction is used to point to the link table; and performing the packet processing operation in the link table, wherein the packet processing operation is used to discard or buffer the target data packet when a bit rate of an aggregate service flow is greater than a specified maximum aggregate rate.

6. The apparatus according to claim 5, wherein the discarding or buffering the target data packet comprises:

directly discarding or buffering the target data packet; or discarding or buffering the target data packet according to a packet discarding or buffering policy.

7. The apparatus according to claim 6, wherein the discarding or buffering the target data packet according to a packet discarding or buffering policy further comprises:

discarding or buffering the target data packet when a priority of the target data packet is lower than a priority of another data packet in the aggregate service flow; or discarding or buffering the target data packet when a priority of the target data packet is a specified priority.

8. A system for aggregate rate control, comprising:

a software-defined networking (SDN) controller, configured to generate a flow entry and a link table, wherein the flow entry includes at least a match field and a flow-entry instruction, and the link table includes at least a packet processing operation, and to send the flow entry and the link table to a gateway switch; and the gateway switch is configured to receive the flow entry and the link table from the SDN controller, to parse a received target data packet to obtain header information of the received target data packet, to match the header information with the match field in the flow entry, to execute a link instruction in the flow-entry instruction in the flow entry, wherein the link instruction is used to point to the link table, and to perform the packet processing operation in the link table, wherein the packet processing operation is used to discard or buffer the target data packet when a bit rate of an aggregate service flow is greater than a specified maximum aggregate rate.

9. The system according to claim 8, wherein the gateway switch is further configured to:

directly discard or buffer the target data packet; or discard or buffer the target data packet according to a packet discarding or buffering policy.

10. The system according to claim 9, wherein the gateway switch is further configured to:

discard or buffer the target data packet when a priority of the target data packet is lower than a priority of another data packet in the aggregate service flow; or discard or buffer the target data packet when a priority of the target data packet is a specified priority.

* * * * *